(12) United States Patent
Biswas et al.

(10) Patent No.: US 8,670,450 B2
(45) Date of Patent: Mar. 11, 2014

(54) EFFICIENT SOFTWARE-BASED PRIVATE VLAN SOLUTION FOR DISTRIBUTED VIRTUAL SWITCHES

(75) Inventors: Amitabha Biswas, San Francisco, CA (US); John Buswell, Athens, OH (US); Dayavanti G. Kamath, Santa Clara, CA (US); Jayakrishna Kidambi, San Jose, CA (US); Vijoy Pandey, Santa Clara, CA (US); Dorit Rond, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 13/107,554

(22) Filed: May 13, 2011

(65) Prior Publication Data

US 2012/0287936 A1 Nov. 15, 2012

(51) Int. Cl.
*H04L 12/56* (2011.01)

(52) U.S. Cl.
USPC .................................................. 370/395.53

(58) Field of Classification Search
USPC .............................................. 370/254–350
See application file for complete search history.

(56) References Cited

U.S. PATENT DOCUMENTS

| | | | |
|---|---|---|---|
| 5,394,402 A | 2/1995 | Ross | |
| 5,617,421 A | 4/1997 | Chin et al. | |
| 5,742,604 A | 4/1998 | Edsall et al. | |
| 5,893,320 A | 4/1999 | Demaree | |
| 6,304,901 B1 | 10/2001 | McCloghrie et al. | |
| 6,567,403 B1 | 5/2003 | Congdon et al. | |
| 7,848,226 B2 | 12/2010 | Morita | |
| 2002/0191628 A1 | 12/2002 | Liu et al. | |
| 2003/0185206 A1 | 10/2003 | Jayakrishnan | |
| 2009/0213869 A1 | 8/2009 | Rajendran et al. | |
| 2010/0223397 A1 | 9/2010 | Elzur | |
| 2010/0257263 A1* | 10/2010 | Casado et al. | 709/223 |
| 2011/0032944 A1 | 2/2011 | Elzur et al. | |
| 2012/0131662 A1* | 5/2012 | Kuik et al. | 726/11 |

OTHER PUBLICATIONS

Pettit et al., Virtual Switching in an Era of Advanced Edges, pp. 1-7, Nicira Networks, Palo Alto, California.

(Continued)

*Primary Examiner* — Ayaz Sheikh
*Assistant Examiner* — Debebe Asefa
(74) *Attorney, Agent, or Firm* — Yudell Isidore Ng Russell PLLC

(57) ABSTRACT

Packet processing logic of a host system's virtualization manager detects packets on the ingress or the egress path to/from a virtual port having three bitmap arrays for processing packets within a virtual local area network (VLAN). The logic checks the VLAN identifier (VID) of the packet to determine, based on an offset position within the corresponding bitmap array, whether the port supports the VLAN. Both the ingress array offset position and egress array offset positions correspond to the value of the VID, and are set within the specific bitmap array during configuration of the VLAN on the port. When the VLAN is supported by the port, the logic enables the packet to be processed by the port. Otherwise, the logic discards the packet. A strip bitmap array indicates when a packet's VID should be removed prior to forwarding the packet on the egress of a port (or destination port).

7 Claims, 11 Drawing Sheets

(56) References Cited

OTHER PUBLICATIONS

Pfaff et al., Extending Networking into the Virtualization Layer, pp. 1-6, Oct. 2009, Proceedings of the 8th ACM Workshop on Hot Topics in Networks (HotNets—VIII), New York City, New York.

Sherwood et al., FlowVisor: A Network Virtualization Layer, pp. 1-14, Oct. 14, 2009, Deutsche Telekom Inc. R&D Lab, Stanford University, Nicira Networks.

Yan et al., Tesseract: A 4D Network Control Plane, pp. 1-15, NSDI'07 Proceedings of the 4th USENIX conference on Networked systems design & implementation USENIX Association Berkeley, CA, USA 2007.

Hunter et al., BladeCenter, IBM Journal of Research and Development, vol. 49, No. 6, p. 905. Nov. 2005.

Ruth et al., Virtual Distributed Environments in a Shared Infrastructure, pp. 63-69, IEEE Computer Society, May 2005.

Rouiller, Virtual LAN Security: weaknesses and countermeasures, pp. 1-49, GIAC Security Essentials Practical Assignment Version 1.4b.

* cited by examiner

| Ingress / Egress | Private VLAN | | | |
|---|---|---|---|---|
| | Promiscuous | Isolated | Community 1 | Community 2 |
| Promiscuous | Allow | Allow | Allow | Allow |
| Isolated | Allow | Deny | Deny | Deny |
| Community 1 | Allow | Deny | Allow | Deny |
| Community 2 | Allow | Deny | Deny | Allow |

EFFICIENT SOFTWARE-BASED PRIVATE VLAN SOLUTION FOR DISTRIBUTED VIRTUAL SWITCHES

BACKGROUND

1. Technical Field

The present invention relates in general to computer networks and in particular to virtualized local area networks (VLANs). Still more particularly, the present invention relates to private VLANs supported by distributed virtual switches.

2. Description of the Related Art

Virtual local area networks (VLANs) are known in the art and represent a broadcast domain in which a client (typically a virtual client) can send frames to other clients that exist within the same VLAN. Private VLANs (PVLANs) represent an extension of this virtualized network paradigm, in which additional security is provided within the network to prevent monitoring of the traffic being communicated, among other benefits. Private VLANs (PVLAN) are a standard feature set supported on most hardware and software based Layer 2 switches. The introduction of distributed virtual switches (DVS) to the PVLAN implementation adds a new layer of complexity to the virtualized networking paradigm.

BRIEF SUMMARY

Disclosed are a data processing system and a computer program product that provide for efficient handling of packets within virtual ports of a distributed virtual switch (DVS) supporting one or more private virtual local area networks (PVLANs) configured with community, isolated and promiscuous sub-domains. Packet processing logic of a host system's virtualization manager detects packets on the ingress or the egress path of a DVS to a virtual port having three VLAN bitmap arrays used for processing packets within a virtual local area network (VLAN). The logic checks the VLAN identifier (VID) of the packet to determine, based on an offset position within the corresponding bitmap array, whether the VLAN is supported by the port. Both the ingress VLAN bitmap array offset position and egress VLAN bitmap array offset position correspond to the value of a VID, and are set within the specific bitmap array during configuration of the VLAN on the port. When the VLAN is supported by the port, the logic enables the packet to be processed by the port. Otherwise, the logic discards the packet. A strip bitmap array indicates when a packet's VID should be removed prior to forwarding the packet on the egress of the port.

In the described embodiment, a host data processing system (host system) having a virtualization manager configures and enables a virtualized computing environment. The virtualized computing environment includes one or more virtual machines and locally-accessible components of a layer 2 distributed virtual switch (DVS) including a plurality of virtual ports supporting packet transmission within at least one virtual local area network (VLAN). A processing resource of the virtualization manager executes packet processing logic/code of the virtualization manager which logic/code causes the virtualization manager to perform various functional processes that enable packet forwarding via the virtual port utilizing a VLAN ID retrieved from the packet and the ingress bitmap array for packets on the ingress path and the egress bitmap array for packets on the egress path of the virtual port. When the VLAN ID is not identified within the specific bitmap array, the packet is discarded. A detected packet on the ingress path or the egress path is only allowed to be processed by the port when the VID identifies a VLAN that has a corresponding offset position in the bitmap array set.

The virtual port is one or more of an access port and an uplink port and each port comprises: an ingress VLAN bitmap containing set offset positions corresponding to VIDs of VLANs that are supported by the port in the ingress path to the port; an egress VLAN bitmap containing set offset positions corresponding to VIDs of VLANs that are supported by the port in the egress path to the port; and a strip VLAN bitmap containing set offset positions corresponding to VIDs identifying VLANS for which the VID is to be removed on the egress path before forwarding the received packet from the port. Each virtual port further comprises a port VLAN ID (PVID), which indicates a VLAN tag that is added to untagged packets on the ingress path. The method then comprises: in response to the received packet on the ingress path not having a VLAN tag, automatically tagging the packet with the PVID of the virtual port; and in response to the detected packet on the egress path having the PVID tagged thereto, automatically removing the PVID from the packet before forwarding the packet.

One embodiment further comprises the virtualization manager: checking whether a strip array offset position within a strip bitmap array of the virtual port is set, indicating that the VLAN is supported by the port and that the VID should be removed before the packet is forwarded, where the strip array offset position corresponds to the value of the VID and is set within the strip bitmap array during configuration of the VLAN on the port; and responsive to the strip array offset position being set, removing the VID from the packet and forwarding the packet without the VID to a destination device of the VLAN identified by the packet.

In one embodiment, each of the ingress bitmap array, egress bitmap array and strip bitmap array is a single dimension array comprising N bit entries, with each bit corresponding to an offset position from 0 through N−1, where N is an integer number representing a maximum number of individual VLANs that can be supported by the virtual port using globally unique identifiers (ID) ranging in value from 0 through N−1; an offset position in one of the ingress bitmap array, egress bitmap array and strip bitmap array is set when a value of that bit position in the respective bitmap array has a value of one (1); and the process of checking whether the offset position is set comprises comparing the value at that offset position to one (1) and indicating the offset position is set when the value is equal to one (1).

Finally, embodiments enable the virtualization manager to generate the set of three bitmaps and assign the globally unique port ID when configuring a new virtual port and to modify/update the bitmaps of a virtual port to support multiple VLANS and vice versa. The set of three bitmaps is assigned to each virtual port configured and updated to support the addition of additional VLANs to enable efficient handling of packets detected on the ingress and egress paths to the virtual port.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein.

DETAILED DESCRIPTION

Figure 1:
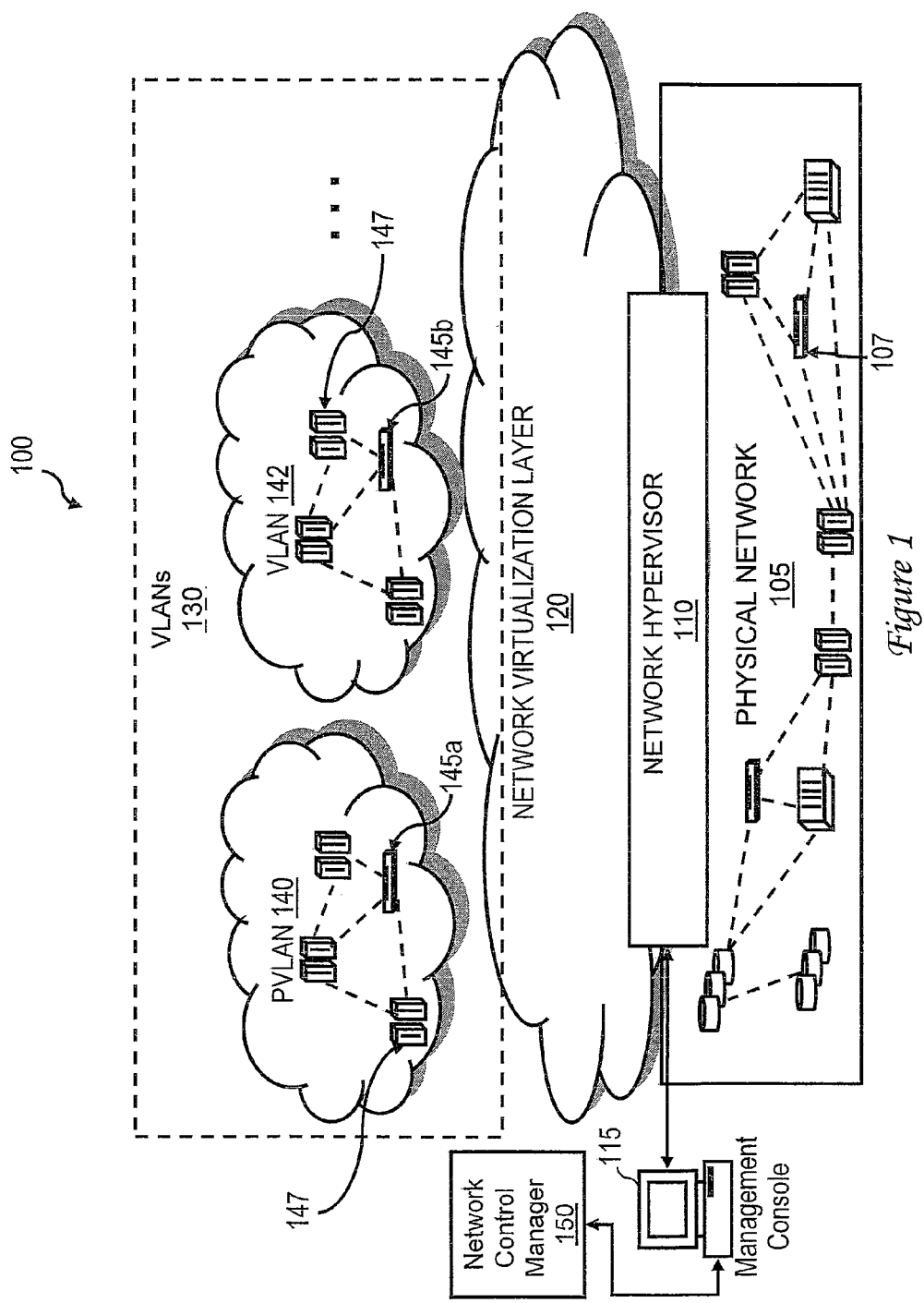
FIG. 1 is a diagram illustrating a topology of a virtualized computer network, which is configured with one or more virtual switches, according to one embodiment.

The illustrative embodiments provide a method, data processing system, and a computer program product that enables efficient packet processing at a virtual network port of a distributed virtual switch (DVS) in a virtualized computing environment. The method is performed in a virtual platform in which packet processing logic is enhanced to enable more efficient packet processing within a virtual port of a private virtual local area network (PVLAN). According to the one or more aspects of the described embodiments, the packet processing logic enables both virtual and physical client machines to more efficiently communicate with each other across the distributed virtual network utilizing a set of bitmaps and a PVID assigned to each virtual port. Specifically, presented aspects of the method comprises: detecting an incoming transmission of a packet at a first virtual port of the DVS, where the first virtual port is assigned to enable routing of received packets to and from devices within one or more VLANs; retrieving a VLAN ID (VID) from the header of the packet, where the VLAN ID is a value assigned to uniquely identify the particular VLAN from other VLANs of a plurality of VLANs that can be supported by the first virtual port. The method then enables packet forwarding via the virtual port utilizing the VLAN ID retrieved from the packet and the ingress bitmap array for packets on the ingress path and the egress bitmap array for packets on the egress path of the virtual port. When the VLAN ID is not identified within the specific bitmap array, the packet is discarded. A detected packet on the ingress path or the egress path is only allowed to be processed by the port when the VID identifies a VLAN that has a corresponding offset position in the bitmap array set.

Additionally, in one embodiment described in greater detail below, when the packet is detected on the egress of the port, the method comprises: checking whether a strip array offset position within a strip bitmap array of the virtual port is set, indicating that the VLAN is supported by the port and that the VID should be removed before the packet is forwarded, where the strip array offset position corresponds to the value of the VID and is set within the strip bitmap array during configuration of the VLAN on the port; and responsive to the strip array offset position being set, removing the VID from the packet and forwarding the packet without the VID to a destination device of the VLAN identified by the packet.

One or more embodiments of the method enable the virtualization manager to generate the set of three bitmaps and assign the globally unique port ID when configuring a new virtual port and to modify/update the bitmaps of a virtual port to support multiple VLANS and vice versa. The set of three bitmaps is assigned to each virtual port configured and updated to support the addition of additional VLANs to enable efficient handling of packets detected on the ingress and egress paths to the virtual port.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized. As utilized herein, the term ingress refers to the packets coming into the switch (which is the DVS in the presented embodiments) on that port, while the term egress refers to the packets going out of the switch using that port. Ingress and egress are utilized to reference the ingress path of a port and the egress path of the port, respectively.

As further described below, implementation of the functional features of the invention is provided within processing devices/structures and involves use of a combination of hardware, firmware, as well as several software-level constructs (e.g., program code). The presented figures illustrate both hardware components and software components within a specific example of data processing architecture. The illustrative and described embodiments assume that the system architecture may be scaled to a much larger data processing system and/or network.

With specific reference now to FIG. 1, there is depicted a block diagram of an example virtualization network structure, such as a data center or an enterprise network, and which can be also be conventionally referred to as a "cloud". Virtualization network structure 100 comprises an underlying physical network 105. The physical network 105 can include a plurality of machines/devices (as generally illustrated within the physical network 105), including one or more physical servers, routers, adapters, databases, as well as physical switches that are interconnected to each other and communicate with each other via one or more types/forms of connecting fabric (indicated by the dashed lines). Virtualization network structure 100 also comprises network virtualization layer 120 which is generated by one or more network hypervisors 110 to support a plurality of virtual local area networks (VLANs) 130. The virtual machines/devices are hosted on a virtualization platform (such as a server) having physical hardware resources (see FIGS. 2 and 3) that are provisioned via one or more implementations of a virtualization manager (see FIG. 3), such as Power Hypervisor (PHYP) of International Business Machines (IBM) Corporation.

Physical network 105 consists of the physical forwarding elements. The forwarding elements can be traditional hardware switches (e.g., switches 107) with standard forwarding silicon, as well as virtual switches such as those included with hypervisors. The switches provide support for a protocol to allow their flow tables to be adjusted to support implementation of distributed virtual switches. Physical switches 107 can include any commercially available or proprietary switch that can include OpenFlow or other standard or proprietary protocol. The forwarding elements in physical network 105 are used by network hypervisor 110 to implement distributed virtual switches (DVS), such as DVS145*a*, 145*b*. As described herein, a DVS provides a logical view of a switch, which is decoupled from the underlying hardware and can extend across multiple physical switches or multiple hypervisors. Virtual switches 145*a*, 145*b* communicate with virtual machines and can also have physical connectivity to physical NICs, while physical switches 107 communicate with physical hosts. As provided herein, DVS 145 is maintained by network hypervisor 110 and can extend across subnets. Each DVS 145 can include multiple physical hosts or physical network ports, and multiple DVSes can share the same physical hardware.

The network hypervisor 110 provides the provisioning functionality that creates and maintains the network virtualization layer 120 and the hypervisor 120 also creates and maintains the logical forwarding elements and maps these elements to the underlying hardware. In one embodiment, network hypervisor 110 can be implemented by a controller (e.g., management console 115) using a network operating system. Control of the network virtualization layer is provided by network control manager 150, generally illustrated as associated with management console 115. Network control manager 150 is a software utility that executes on management console 115, which can be a physical or virtual device that connects to network hypervisor 110, and network control manager 150 is utilized to set up the various virtual devices and provisioning of resources to these virtual devices. Network virtualization layer 120 enables virtual ports within a DVS 145 to be abstracted to and to utilize the physical network switches (within the physical network 105) to communicate packets between devices of a VLAN (e.g., PVLAN 140). Thus network hypervisor 110 maintains mappings that enable routing of communication between the devices of the single VLAN and enables routing of packets from and to the VLAN to external devices.

Within the above described virtualization network structure, example private VLAN (PVLAN) 140 and VLAN 142 are illustrated. It is appreciated that these two VLANs represent only two of a potentially large number of VLANs, which can comprise multiple PVLANs 140 and multiple VLANs 142. Both PVLAN 140 and VLAN 142 can be supported via respective distributed virtual switches (DVS) 145 that can span across multiple host devices and which each provide a plurality of virtual ports assigned to the various virtual machines that are interconnected within the PVLAN 140 or VLAN 142.

Those skilled in the art are aware that with the rapid expansion of the virtualization computing paradigm and move towards cloud computing, large hosting services or enterprise networks can maintain multiple data centers, or networks at several sites, which may be geographically dispersed (e.g. San Francisco, N.Y., etc.). Connecting client machines/devices from within these geographically dispersed sites into a single virtual local area network (VLAN) thus requires utilization of one or more distributed virtual switches (DVS). These DVS (e.g., DVS 145) are supported via network virtualization layer 120, generated by network hypervisor 110. Each DVS 145 in turn provides a plurality of virtual ports utilized to support packet transmission to/from/within one or a plurality of VLANs 130, including one or more private VLANs (PVLAN) 140 and/or one or more VLANs 142.

Figure 2:
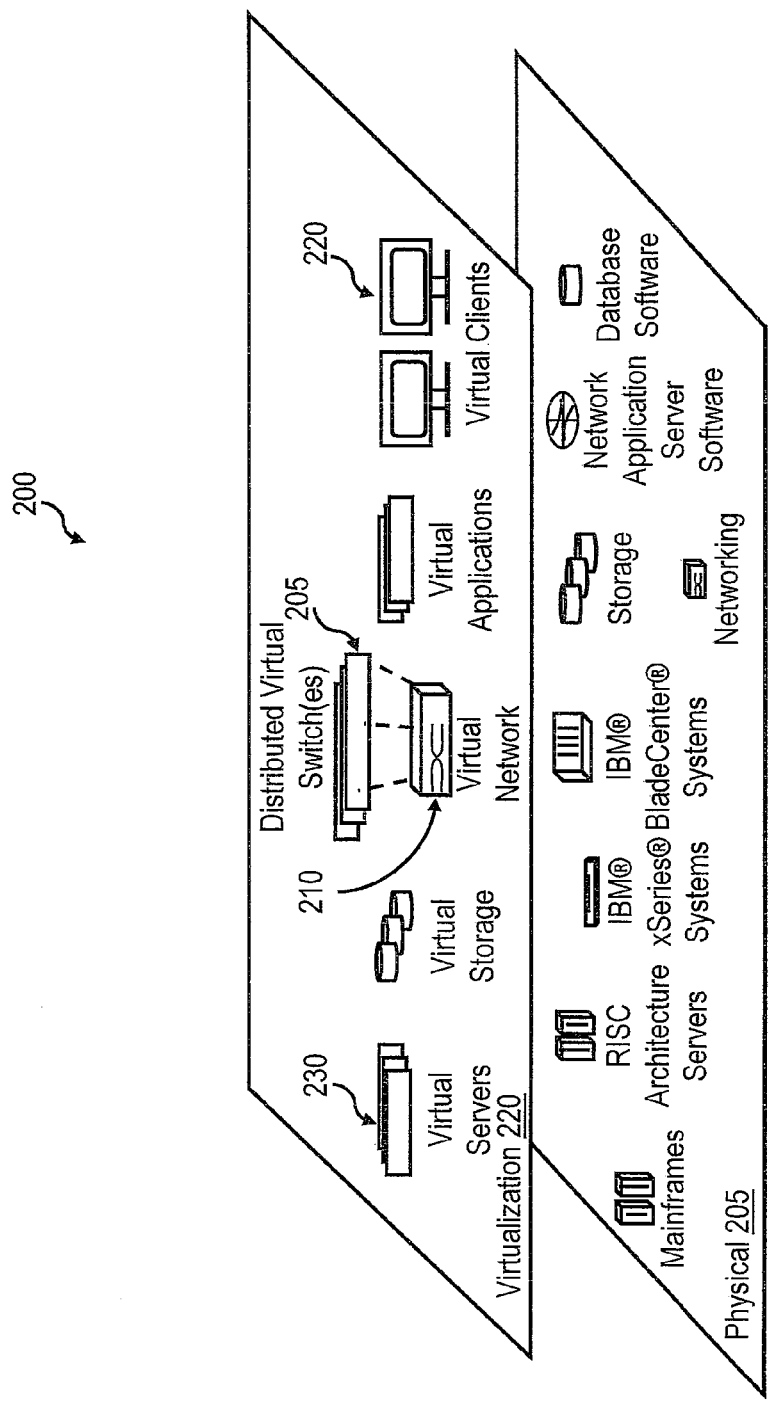
FIG. 2 is a layered illustration of the physical and virtualization components that make up an example virtualized computer network with distributed virtual switches, according to one embodiment.

Referring now to FIG. 2, which illustrates an expanded view depicting some components of the physical hardware layer and of the network virtualization layer of FIG. 1. It should be understood that the computing resources, layers, and functions shown in FIG. 2 are intended to be illustrative only and embodiments of the claimed inventions are not limited thereto. As depicted, physical layer 200 includes various physical hardware and software components that can be used to instantiate virtual entities for use within the virtualization network structure. As an example, the hardware components may include mainframes (e.g., IBM® zSeries® systems), reduced instruction set computer (RISC) architecture servers (e.g., IBM pSeries® systems), IBM xSeries® systems, IBM BladeCenter® systems, storage devices (e.g., flash drives, magnetic drives, optical drives, tape drives, etc.), physical networks, and networking components (e.g., routers, switches, etc.). The software components may include operating system software (e.g., AIX, Windows, Linux, etc.), network application server software (e.g., IBM WebSphere® application server software, which includes web server software), and database software (e.g., IBM DB2®, database software). IBM, zSeries, pSeries, xSeries, BladeCenter, WebSphere, and DB2 are trademarks of International Business Machines Corporation, registered in many jurisdictions worldwide. Windows is a trademark of Microsoft Corporation, and Linux is a trademark of Linus Torvalds.

The computing resources residing in physical layer 205 are virtualized and managed by one or more virtual machine monitors (VMMs) or hypervisors (e.g., network hypervisor 110). As shown, virtualization layer 220 includes multiple virtual entities (e.g., virtual servers, virtual storage, virtual networks (including virtual private networks)), virtual applications, and virtual clients. These virtual entities, which are abstractions of the underlying resources in physical layer 200, may be accessed by client devices 147 connected within the virtualized network environment. The client devices 147 can be real devices or virtual devices (e.g., virtual machines, VM).

Figure 3:
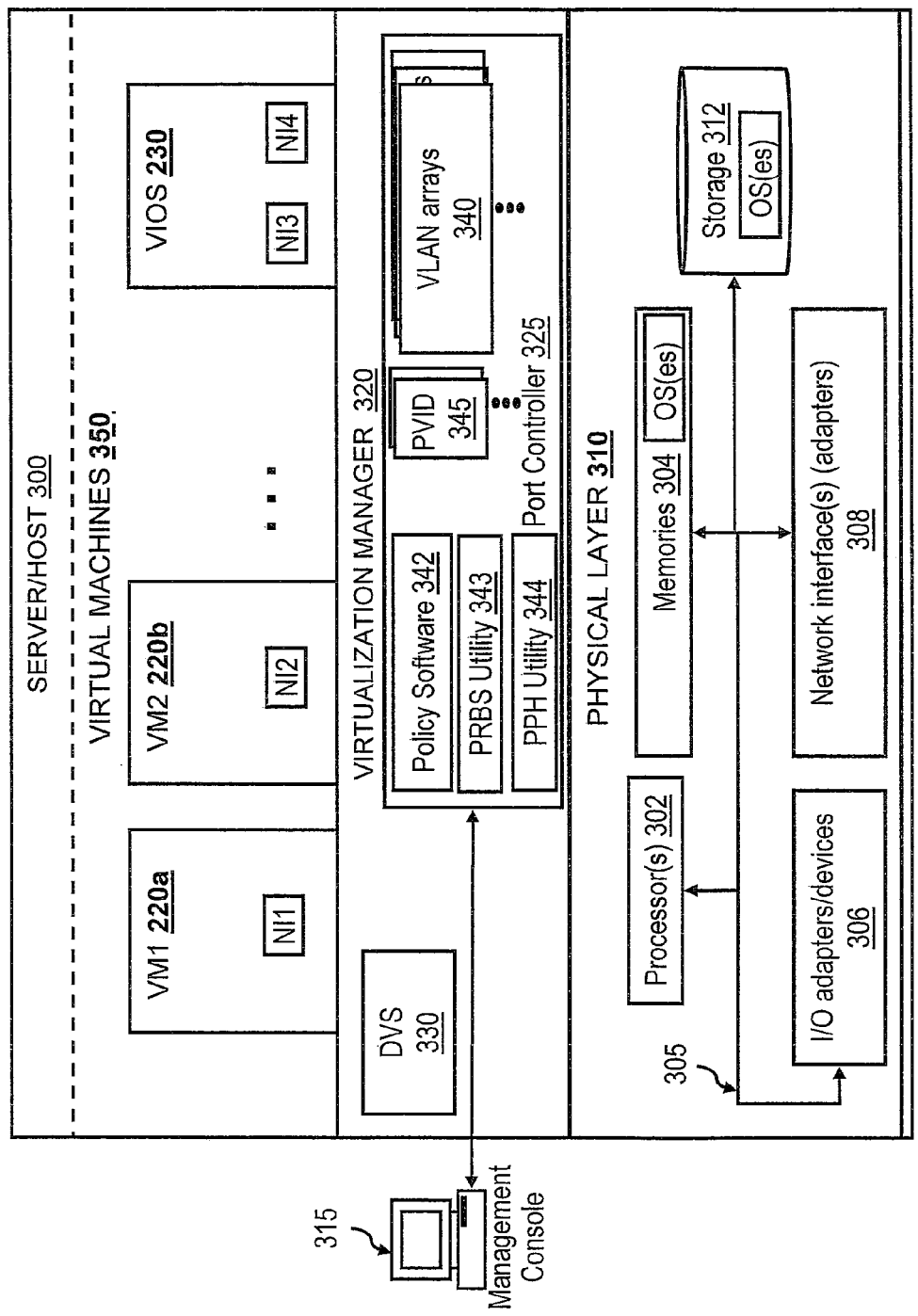
FIG. 3 is a block diagram illustration of components of a physical server that is virtualized to provided multiple virtual machines and virtual server, according to one embodiment.

FIG. 3 illustrates an example computer server platform that has been virtualized to generate a plurality of virtual client devices, one or more of which is a client device within a VLAN or PVLAN that is supported by a DVS having multiple virtual ports. Server 300 is interchangeably referred to herein as a host or host device or host data processing system. Thus, host device 300 comprises hardware components and software/firmware/OS components that are logically partition to create a plurality of virtual machines (VMs) or operating system (OS) partitions, which can be configured as client logical partitions (LPARs) and/or virtual I/O servers (VIOSes). For simplicity, all client LPARs are referred to hereinafter as VMs, of which VM1 220a and VM2 220b are illustrates as examples. A single VIOS 230 is also illustrated for reference. It is however, appreciated that the system can be configured solely with VMs, i.e., without any VIOSes, in one or more implementations. Physical layer 310 comprises one or more processors 302, one or more memories 304, and local (data) storage 312. The one or more processors 302 are interconnected with one or a plurality of memories 304 and with local storage 312 via a bus, interconnect/switch or an interconnect fabric, generally referenced as interconnect fabric 305. The specific internal connectivity of components, which may be distributed across a large scale interconnect fabric, is not germane to the described embodiments, and no further detail is presented regarding the particular type of interconnectivity between the system hardware components.

Also included within physical layer 310 are one or more physical network interfaces (NI) 308 (also conventionally referred to as network adapters) which supports/enables the physical connection of host system 300 (and the VMs 220a/220b and VIOS 230) to an external network (e.g., network 105, FIG. 1). Additionally, physical layer 310 comprise a plurality of I/O adapters and I/O devices 306, which provides the I/O interface for host system 300. I/O adapters 306 are physical adapters that enable host system 300 to support I/O operations via an I/O interface with both locally connected and remotely (networked) connected I/O devices. Examples of I/O adapters include Peripheral Component Interface (PCI), PCI-X, or PCI Express Adapter, and Small Computer System Interconnect (SCSI) adapters, among others. Host system 300 is logically partitioned such that different I/O adapters 306 are virtualized and the virtual I/O adapters may then be uniquely assigned to different logical partitions (VMs and/or VIOSes).

Logically located above the physical layer (310) is a virtualization manager 320, which can be a Power Hypervisor (PHYP), a trademark of IBM Corporation), in one embodiment. While introduced as a PHYP, it is fully appreciated that other types of virtualization management components may be utilized and are equally applicable to the implementation of the various described embodiments. The virtualization manager 320 can have an associated service processor (not illustrated) within the physical layer 310 or located elsewhere relative to the virtualization manager 320. The service processor can be used to provide various services for one or more logical partitions. As illustrated, hardware management controller (HMC) 315, which exists outside of the physical layer 310, communicates with host system 300 via virtualization manager 320. Operations of the different logical partitions can be controlled through HMC 315, which can be a separate data processing system from which a system administrator can perform various functions, such as reallocation of resources to different logical partitions.

Host system 300 further comprises a plurality of user-level logical partitions (LPARs), of which two virtual machines (VM1 220a and VM2 220b) and one virtual I/O server (VIOS) 230 are shown. According to the various illustrative embodiments, host system 300 supports multiple clients and other functional operating system (OS) partitions that are "created" within a virtualized environment. Each LPAR receives an allocation of specific virtualized hardware and OS resources, including virtualized CPU resources, virtualized memory resources, virtual OS, and access to assigned local storage. Each LPAR includes a respective host operating system that controls low-level access to physical layer 310 and/or to virtualized I/O functions and/or services provided through VIOS 230. In one embodiment, the operating system(s) may be implemented using OS/400, which is designed to interface with a partition management firmware, such as PHYP, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and Linux Torvalds) for example, may be utilized, depending on a particular implementation, and OS/400 is used only as an example.

Additionally, according to the illustrative embodiment, each logical partition is provided one or more virtual network interfaces, numbered as NI1 . . . NI4 for illustrative purposed only. These NIs allows the LPAR to communicate with other LPARs both on the host system and with other devices across a distributed network. In the described embodiments, at least one of the VMs 220a/220b is a part of a PVLAN and is connected to a DVS that enables connectivity across the PVLAN. DVS 330, which can be a local portion of a larger DVS spanning multiple host systems, is provided within virtualization manager 320. DVS 330 comprises a plurality of virtual ports, each assigned to one or more VMs within the PVLAN to enable transmission of packets to and from the associated device within the PVLAN.

According to one embodiment, packet transmission across the virtual ports of the DVS is made more efficient with the utilization of port routing bitmap arrays. As further shown within host system 300, virtual manager 320 comprises a port controller 325 which is associated with one or more DVSes supported by the host system 300. Port controller 325 comprises policy software component 342, which defines port routing policies and connectivity policies, among others. Port controller also comprises port registration and bitmap setup (PRBS) utility 343 and Port packet handling (PPH) utility 344. The functions provided by PRBS utility 343 and PPH utility 344 are described in detail below within the descriptions of FIGS. 6-8. Additionally, port controller 325 comprises a plurality of individual PVIDs 345 associated with each port and corresponding sets of three VLAN arrays 340, each set corresponding to one PVID and the associated port. The method by which the bitmap arrays 340 are generated and then utilized to provide more efficient packet processing through the virtual ports of a DVS will be described in greater details with reference to FIGS. 6-9.

Figure 4:
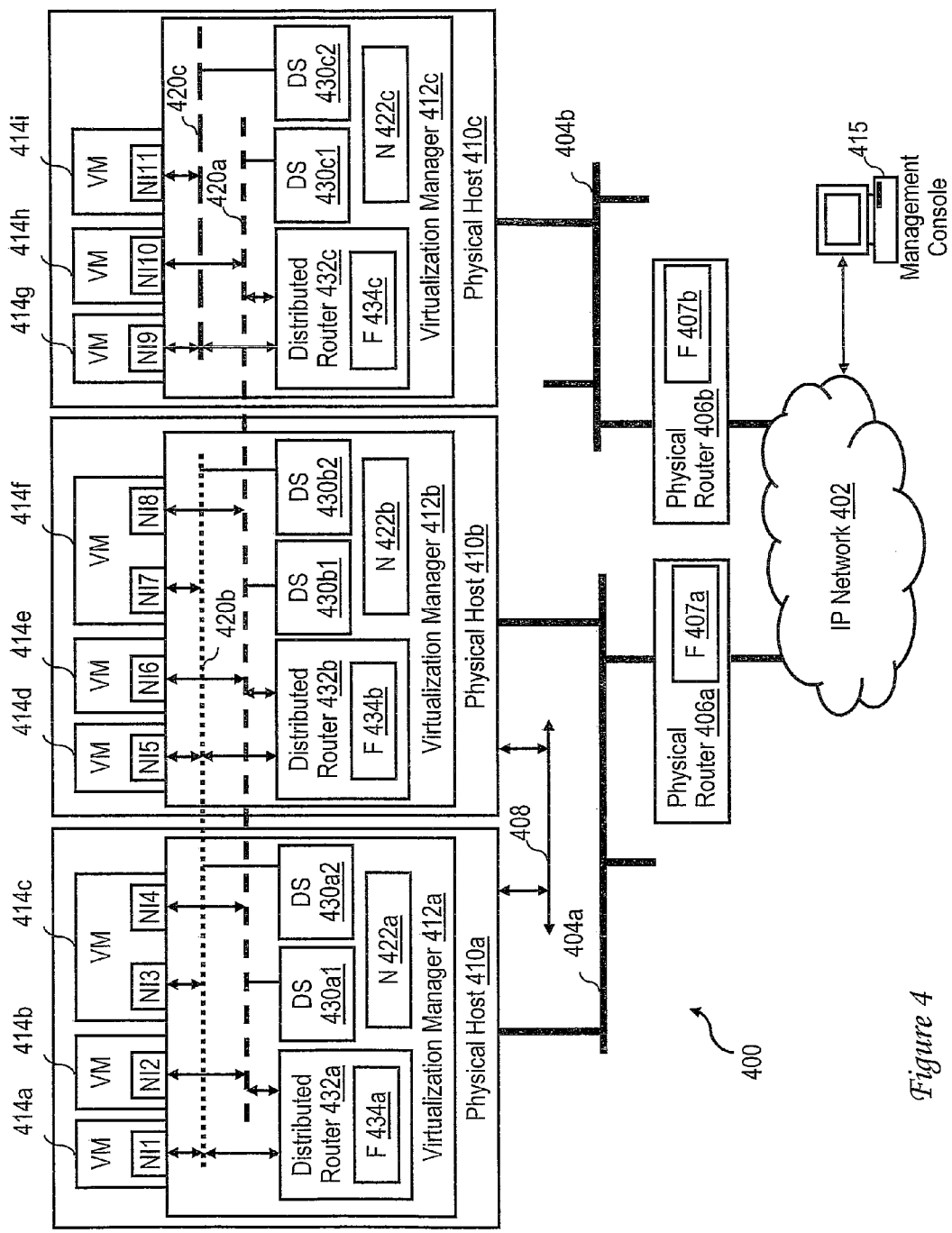
FIG. 4 is a block diagram illustration of an example distribution across multiple physical hosts of a layer 2 distributed virtual switch (DVS) in a virtual network comprising a private local area network (PVLAN) domain, according to one embodiment.

Referring now to FIG. 4, there is illustrated a view of a data processing environment comprising real and virtual connections between multiple physical host systems supporting virtual machines interconnected within a virtual networking topology/environment comprising distributed virtual switches. In the depicted embodiment, data processing environment 400 includes an Internet protocol (IP) network 402 including a plurality of network segments 404a, 404b, each of which is coupled to a respective one of physical routers 406a, 406b. As is known in the art, each of physical routers 406a, 406b includes a respective forwarding table 407a, 407b by which physical routers 406a, 406b route incoming data packets toward the packets' destinations based upon OSI Layer 3 (e.g., Internet Protocol (IP)) addresses contained in the packets. Physical host systems 410a, 410b are coupled to network segment 404a, and physical host system 410c is coupled to network segment 404b. Physical hosts, such as physical host systems 410a, 410b, optionally may be additionally coupled by a secondary host connection 408, such as direct cabling or a private non-routed network. Each of physical host systems 410a-410c can be implemented, for example, utilizing a host system 300 as depicted in FIG. 3.

Each of physical host systems 410a-410c executes a respective one of virtualization manager 412a-412c, which virtualizes and manages the resources of its respective physical host 410, for example, under the direction of a human and/or automated administrator at a management console 415 coupled to physical host systems 410a-410c by IP network 402. Virtualization manager 412a on physical host system 410a supports the execution of VMs 414a-414c, virtualization manager 412b on physical host system 410b supports the execution of VMs 414d-414f, and virtualization manager 412c on physical host system 410c supports the execution of VMs 414g-414i. In various embodiments, VMs 414a-414i can include VMs of one or more cloud consumers and/or a cloud provider. In the depicted embodiment, each of VMs 414 has at least one (and in some cases multiple) virtual network interfaces NI1-NI11, which provide network connectivity at least at Layers 2 and 3 of the OSI model.

As depicted, each of virtualization managers 412a-412c provides one or more (and in the depicted embodiment, at least two) virtual networks to which the manager's VMs 414 can attach. To visually distinguish them from physical subnetworks 404a-404b, virtual networks are represented in FIG. 4 in dashed line illustration. For example, in the depicted embodiment, virtualization managers 412a-412c all provide a first distributed virtual network 420a through the implementation of individual virtual switches 430a1, 430b1 and 430c1 providing Layer 2 connectivity. Virtualization managers 412a-412b similarly provide a second virtual network 420b through the implementation of DVSs 430a2 and 430b2. In addition, virtualization managers 412c provides a third virtual network 420c through the implementation of distributed switch 430c2. In various embodiments, each of virtual networks 420a-420c can be, for example, a private network (e.g., a PVLAN) of a particular cloud consumer, a collaborative private network shared by multiple cloud consumers and/or a cloud provider, or a public network. In the depicted example, network interfaces NI2, NI4, NI6, NI8, and NI10 are connected to first virtual network 420a, network interfaces NI1, NI3, NI5, and NI7, are connected to second virtual network 420b, and network interfaces NI9 and NI11 are connected to third virtual network 420c. Each virtualization manager 412 preferably records information regarding the virtual network(s) 420 the particular virtualization manager supports and the connection of the corresponding VMs 414 to the virtual network(s) 420. This information is recorded as a respective one of network information 422a, 422b and 422c. For example, a first virtualization manager 412a can create an entry in its network information 422a for one of its VMs 414a, 414b, or 414c when the particular VM 414 is provisioned, deployed or migrated in, and the first virtualization manager 412a can remove the entry from the network information 422a when the VM 414 is migrated out or destroyed.

In one optional implementation, in order to support communication between virtual networks 420a-420c and between virtual networks 420 and physical networks 402 and/or 404, virtualization manager 412a-412c can each implement a respective one of distributed routers 432a-432c to provide OSI Layer 3 routing. In alternate embodiments, however, it is possible to not implement any routing functionality within a physical host. In the depicted embodiment, each distributed router 432 provides a respective network interface for each virtual network 420 instantiated by the router's virtualization manager 412, as well as a network interface to the physical network segment 404 to which the physical host 410 is attached (e.g., through a software port of a physical network interface 304). Each distributed router 432 additionally includes a respective forwarding table 434a, 434b and 434c for storing routing information.

Those of ordinary skill in the art will appreciate that the hardware, firmware/software utility, and software components and basic configuration thereof depicted in FIGS. 1-4 may vary. The illustrative components of the various figures are not intended to be exhaustive, but rather are representative to highlight some of the components that are utilized to implement certain of the described embodiments. For example, different configurations of a data processing systems and/or host system can be provided, containing other devices/components, which can be used in addition to or in place of the hardware depicted, and may be differently configured. The illustrated examples are not meant to imply architectural or other limitations with respect to the presently described embodiments and/or the logical extensions thereof.

Figure 5A:
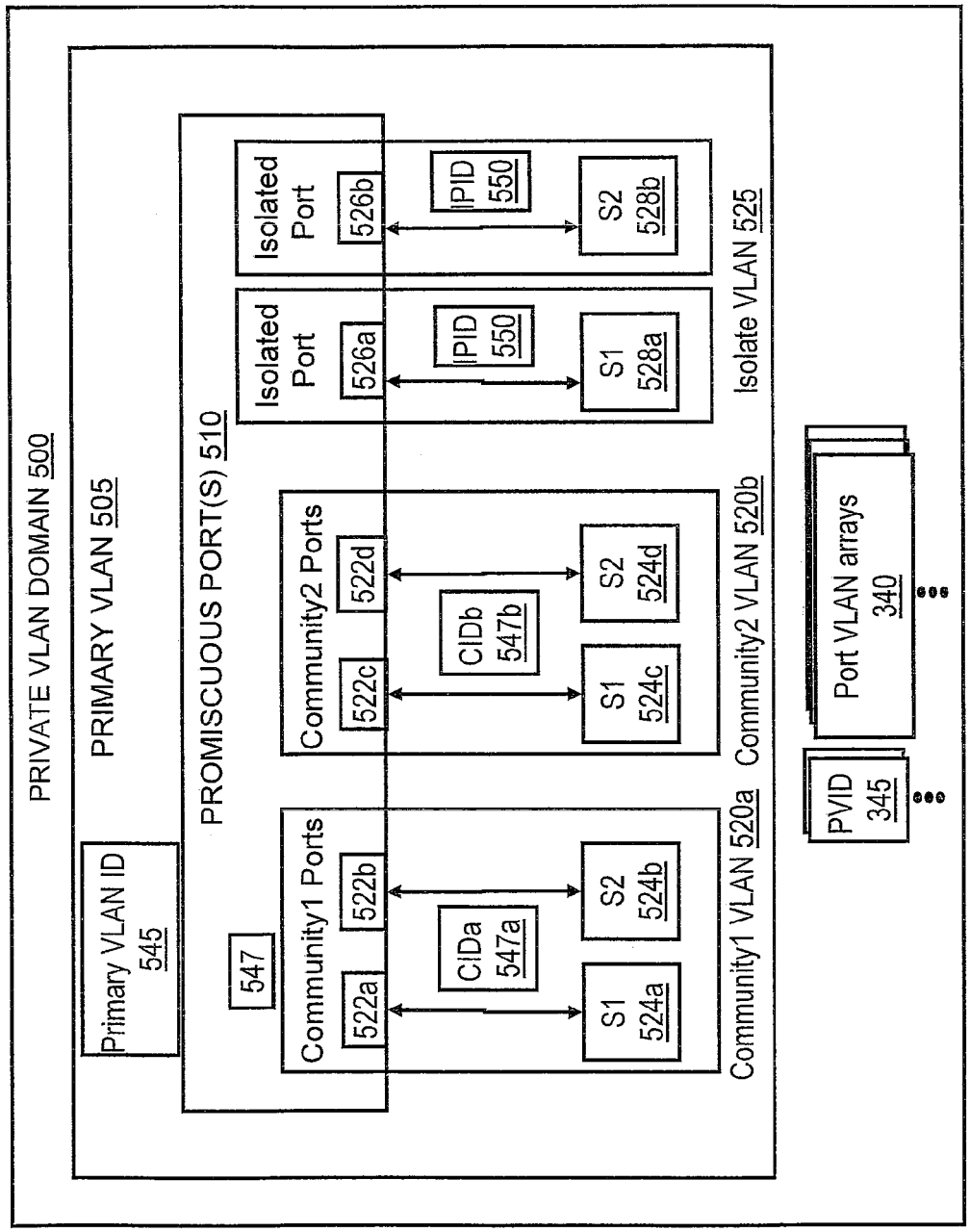
FIG. 5A illustrates the different ports that exist within an example PVLAN configured with bitmap arrays, according to one embodiment.

With reference now to FIG. 5A, there is illustrated a port view of a PVLAN domain. PVLAN domain 500 comprises primary VLAN 505, which in turn provides two community VLANs, named Community 1 VLAN 520a and Community 2 VLAN 520b, as well as Isolated VLAN 525. These VLANs are interrelated and defined within a layer 2 (L2) switch. The community VLANs 520a, 520b and isolated VLAN 525 are collectively referred to herein as secondary VLANs (indicated by the dashed surrounding lines). Each VLAN has an associated VLAN ID, which uniquely identifies that VLAN within the DVS. Within PVLAN are three related ports, defined, respectively, as promiscuous ports, isolated ports and community ports. As provided herein, the promiscuous ports are connected to layer 3 (L3) or layer 4 (L4) devices (e.g., routers) that may in turn connect to the Internet or administrative work station or common network servers, e.g. a Dynamic Host Configuration Protocol (DHCP) server. The isolated port and community ports connect to individual virtual and physical user devices or servers, such as VMs in FIGS. 3 and 4, and the isolated ports and community ports carry traffic originating from or received for one of the devices within the PVLAN.

During packet routing, the primary VLAN 505 connects the promiscuous ports 510 with community ports 522a-d or isolated ports 526a, 526b. Specifically, primary VLAN 505 receives packets from L3/L4 devices at the promiscuous ports 510 and transfers the packets to one or more of the secondary VLANs. As provided herein, an isolated VLAN is defined as a VLAN that functionally connects isolated ports to promiscuous ports. In an isolated VLAN the traffic is only one way, i.e., packets are received at an isolated port and travel only from that isolated port to a promiscuous port. Packets are not available to other isolated or community ports. A community VLAN is defined as a VLAN that functionally connects community ports to promiscuous ports. Within a community VLAN, traffic is only routed one way, i.e., packets are received at a community port and travel only from that community port to the promiscuous ports and to the other community ports on that community VLAN. In the described routing protocol, packets do not travel from a community port to isolated ports, or to community ports on a different community VLAN that may exist on the same switch.

When configuring a VLAN within an L2 switch, an administrator can manually designate ports within the VLAN. However, when configuring PVLANs, the administrator defines a primary VLAN and one or more secondary VLANs. With the described embodiment, for a software-enabled DVS (as presented by FIG. 4) to support the PVLAN feature, the DVS must support all of the three types of ports supported within a PVLAN, enforce the communication restrictions enforced by PVLANs (which can be defined by example policy software 342, FIG. 4), and support multiple PVLAN domains.

While existing within the layer 2 domain of communication, PVLAN 500 has multiple sub-domains. As defined herein, each PVLAN sub-domain consists of two VLAN IDs (VIDs), specifically a Primary VLAN ID and a secondary VLAN ID. The Primary VLAN represents the PVLAN communication domain, while the secondary VLANs are communication sub-domains with a PVLAN domain. Thus, a secondary VLAN ID is a globally unique ID amongst all PVLANs supported in a network. Each network port falls in one (and only one) of the 3 types of sub-domains within a single PVLAN, defined as follows:

(1) Promiscuous Ports—These ports can communicate with all ports in a PVLAN domain. The promiscuous port supports a secondary VLAN ID 547 that is the same as the primary VLAN ID 545 of PVLAN 500.

(2) Community Ports—These ports can communicate with promiscuous ports and other ports within the same community (e.g., community port 522a can exchange communication with community port 522b within Community 1 VLAN 520a). As presented by FIG. 5, there can be multiple communities within a single/same PVLAN 500. Each community is represented by a unique VLAN ID 547a, 547b, which is different from the primary VLAN ID 545, the isolated VLAN ID 550 and the VLAN IDs of other communities.

(3) Isolated Ports—These ports can only talk to the promiscuous ports. The secondary VLAN ID of an isolated port 526a, 526b is a VLAN ID that is different from the primary VLAN ID 545. In one embodiment, only one isolated VLAN ID (550) is supported within PVLAN 500.

Each port enables communication to and from one or more end devices, of which end device 524a-524d are illustrated, as two end devices (S1, S2) per community VLAN 520a, 520b. Isolated VLANs 525 also each include end devices 528a, 528b, with one end device (S4, S5, respectively) illustrated per isolated VLAN 525.

Figure 5B:
FIG. 5B is a table that illustrates the transferability of packets from one type of port to another within the PVLAN of FIG. 5, according to one embodiment.

The table 500 of FIG. 5B summarizes the port actions within the Private VLAN illustrated by FIG. 5A. Supporting a PVLAN solution on a DVS depends on the software entities on each host enforcing the communication restrictions required by the PVLAN. In DVS related applications, the DVS solution typically consists of software entities in multiple hosts/machines. The software entity forwards packets amongst the DVS access ports (e.g., ports that connect to a Virtual Machine) within the host system and communicates with the outside network by forwarding (to and from the host) using network cards (uplink ports) on the host system. The software entity on a particular virtual machine is only aware of the ports supported on that virtual machine, which may only be a (small) subset of all the ports supported by the entire DVS solution. While it is possible that the software entity be made aware of ports on other hosts (within the same DVS), this configuration would add an unnecessary layer of complexity and size to the forwarding table in the software entity (i.e., the local DVS).

Traffic Switched at layer 2 is based on frames of data with MAC headers. Layer 2 switches can contain hundreds of ports on a single switch. Private VLANs provide layer 2 isolation between the ports within the same broadcast domain. Private VLANs partition a regular VLAN domain into sub domains, represented by a pair of VLANs, a primary VLAN and a secondary VLAN. Every port in a private VLAN is a member of the primary VLAN. The primary VLAN carries unidirectional traffic downstream from the promiscuous ports to the isolated and community ports and to other promiscuous ports. An isolated VLAN carries unidirectional traffic upstream from the isolated ports toward the promiscuous ports. Community VLANs carry upstream traffic from the community ports to the promiscuous port and to other host ports in the same community. Multiple community VLANs can be configured in a private VLAN. In one embodiment, a community port can also receive upstream traffic. Additionally, an port that receives upstream traffic can support more than one VLAN. As provided herein, an isolated port is a host port that belongs to an isolated secondary VLAN. The isolated port has the complete layer 2 separation from other ports with in the same private VLAN except for the promiscuous ports. Private VLANs block all the traffic getting to the isolated ports except the traffic from the promiscuous ports, and traffic received from an isolated port is forwarded only to promiscuous ports. A community port is a host port that belongs to a community secondary VLAN. Community ports can communicate with other ports in the same community VLAN and with promiscuous ports. These interfaces are isolated at layer 2 from all other interfaces in other communities and from isolated ports within their private VLAN.

Within a PVLAN, several configuration restrictions apply. A listing of these restrictions can include one or more of the following: (1) There can be only one isolated VLAN in a private VLAN; (2) An isolated port cannot be an uplink port; (3) Secondary VLAN ports cannot overlap other VLANs in the same Private VLAN domain; (4); (4) Default VLAN in the network cannot be a private-VLAN; (5) A primary VLAN that is mapped to a secondary VLAN need to be both created and enabled; (6) If a port is not tagged it cannot support more than one VLAN; (7) A port can either be a promiscuous port or a community port or an isolated port within a Private VLAN domain; (8) Up to 4095 PVLANs can be supported with identifier numbers 0 and 4095 being reserved; and (9) A private VLAN needs to be created and enabled in order for a port to support the PVLAN.

With the increased need of software-based Layer 2 switches in the virtualization solutions, aspects of the embodiments described herein provides an efficient algorithm for network packet processing in the DVS software. As defined hereinafter, these embodiments provide an efficient, O(1), packet processing (data-path) PVLAN solution in a DVS. The described embodiments are built upon the fact that the VLAN ID of any sub-domain (whether promiscuous, isolated or communities) within a PVLAN is globally unique. Thus, one aspect of the embodiments involves the software entities (on a host system) implementing a specific PVLAN policy enforcement by tagging packets with the right VLAN ID in the outbound/ingress path from a port and validating the VLAN ID on packets on the inbound/egress and/or egress path to a port. This method ensures that multiple DVSs can support the same set of PVLAN and enforce the PVLAN policies uniformly. According to the presented embodiments, the efficiency of the described solution is based on how the ports validate the VLAN tags on the packets. While there may be multiple PVLANs domain within a DVS and each access port may belong to multiple PVLAN itself, the method presented by the described embodiment avoids walking any PVLAN lists during packet processing.

Figure 7:
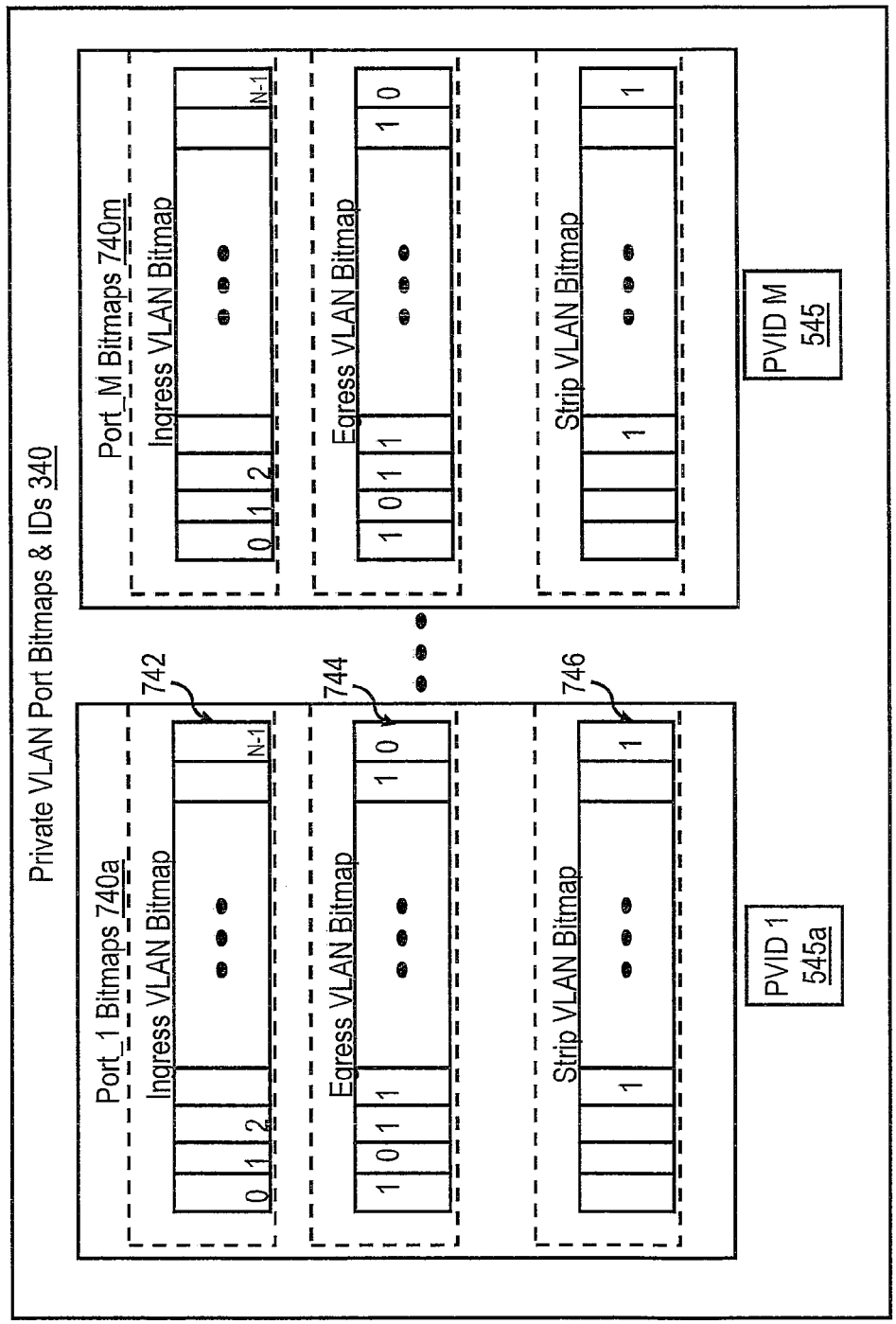
FIG. 7 illustrates example ingress, egress and strip bitmap arrays generated by the method of FIG. 4 and utilized to enable efficient routing within a PVLAN via the DVS, in accordance with one embodiment.

Under the optimized solution provided by the embodiments, each port (both access port and uplink port) in the DVS supports three VLAN bitmaps (also interchangeably referred to herein as bitmap arrays). As now described with reference to FIG. 7, the three bitmaps (or bitmap arrays) of each port are: ingress VLAN bitmap 742, egress VLAN bitmap 744, and strip VLAN bitmap 746. Ingress VLAN Bitmap 742 contains VLANs that a port supports in the ingress path. Egress VLAN Bitmap contains VLANs that the port supports in the egress path. Finally, strip VLAN Bitmap contains VLANs that the software module must remove/strip on the egress path before sending the frame/packet to the port. The bitmap arrays are maintained within port bitmaps 340, which in one embodiment maintains a plurality of port bitmaps 740a . . . 740m, for the M ports supported within the DVS, where M is an integer. As shown by FIG. 7 and example bitmap arrays (740) for Port 1, each bitmap array has N entries corresponding to the maximum number of VLANs supported on the particular DVS. Each of the three VLAN Bitmaps is a single dimension array of N bits. In one embodiment, N=4096 bits (512 Bytes); However the value of N is a system parameter that can be a different number in alternate embodiments. As provided herein, a bit can be set when its value is toggled from a zero (0) to a 1. All bits that are not set therefore contain a value of zero. When a bit is set in the $M^{th}$ position (offset relative to the beginning of the array) of the array, then VLAN M is present in the bitmap. The numbers illustrated within ingress VLAN bitmap 742 of Port 1 represents the N bits in sequential order ranging from 0 through N−1. Egress VLAN bitmap 744 then illustrates that there is a corresponding VLAN present and allocated to locations 1, 3, 4 and N−2 of egress VLAN bitmap 744. Also, strip VLAN bitmap 746 indicates that the packets being routed to VLANs 4 and the last VLAN (N−1) should be stripped of the VLAN ID before routing a packet from that PVLAN to/from the virtual port.

In addition to the bitmap arrays 742, 744, and 746, each port has a PVID VLAN ID 750. The PVID 750 indicates the VLAN tag that must be added to un-tagged packets on the ingress path and also indicates which tags are to be removed on the egress path. According to one embodiment and as illustrated by the method of FIG. 6, the PVLANs (and VLANs) are set appropriately on each bitmap of a port when the port is initially added to a PVLAN (or a non-private VLAN) or vice-versa, which is an infrequent operation and thus not in the path of packet processing.

Figure 6:
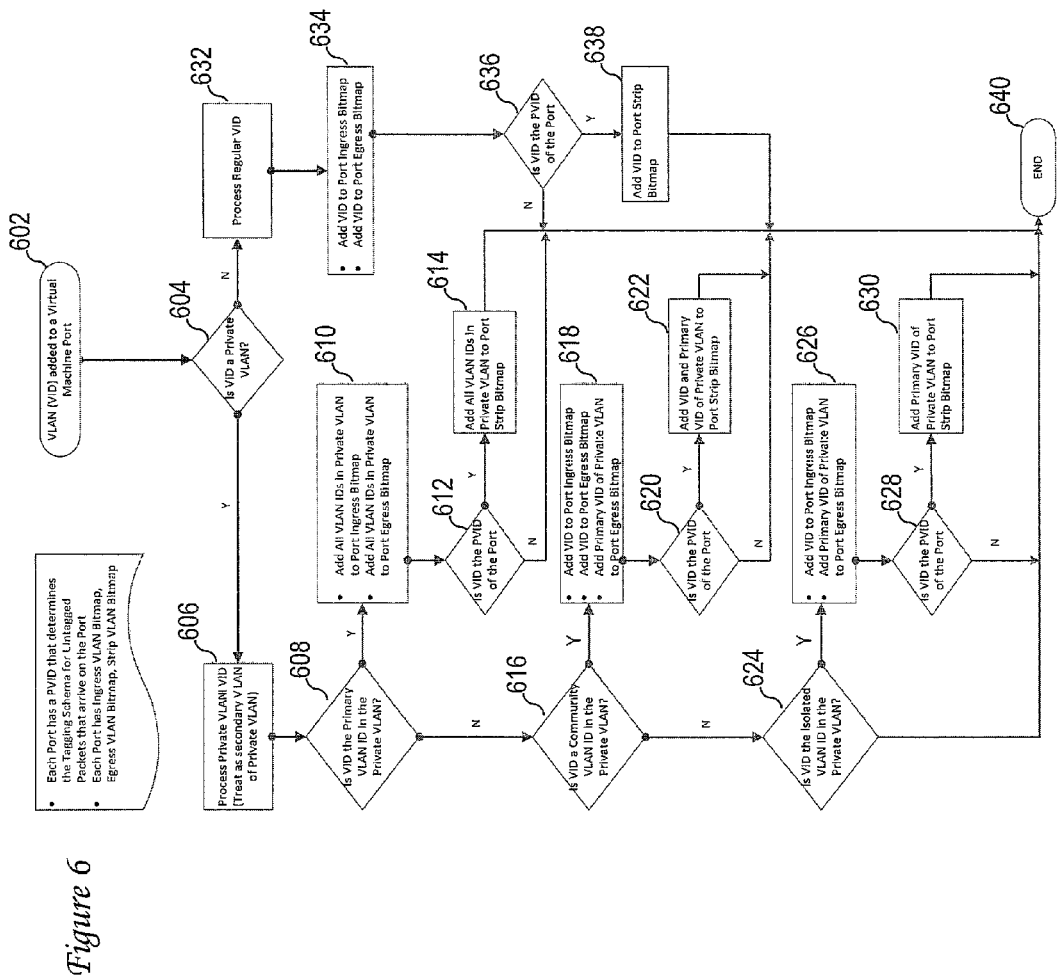
FIG. 6 is a high-level logical flowchart illustrating the method of generating and updating the ingress bitmap, egress bitmap, and strip bitmap arrays for received VLAN identifiers (IDs) being added to a virtual port of a distributed virtual switch (DVS), according to one embodiment.

Referring now to FIG. 6, there is illustrated a method by which an administrator, using a management console and executing software thereon, completes the process of adding a port to a DVS. Once the port information is provided to the software, the controlling software subsequently generates the appropriate three bitmap arrays for that port. It is appreciated that some of these steps can be automated and performed by processing components of management console 315 and that most of the steps can also be performed manually by the network administrator working at the management console 115. As described herein, the method is completed via/with port registration and bitmap setup (PRBS) utility 343, which executes on one more processors (or virtual processors) of either management console 315 (FIG. 3) or a processor of the virtualization manager on the host system itself. The various processes are thus described as being performed by the PRBS utility 343, which may in turn be configured and/or instantiated by the network administrator. Execution of the utility can provide processing logic that performs the various described functions. When initiated by the network administrator, the administrator can interact with the PRBS utility 343 via a command line interface (CLI) on the management console 315, in one embodiment.

The method of FIG. 6 begins at block 602 at which the VLAN ID (VID) is added to a virtual machine port on a DVS. A determination is made at block 604 whether the VID is for a private VLAN. When the VLAN ID is for a private VLAN, the private VLAN is processed and treated as a secondary VLAN of the existing private VLAN (block 606). A next determination is made at block 608 whether the VID is the primary VLAN ID in the private VLAN. In response to the VID being the primary VLAN ID in the private VLAN, all VLAN IDs in the private VLAN are added to the port's ingress bitmap and all of the VLAN IDs in the private VLAN are also added to the port egress bitmap (block 610). At decision block 612, the PRBS utility 343 (FIG. 3) and/or the administrator determines whether the VID is the PVID of the port. In response to the VID being the PVID of the port, the utility/administrator adds all VLAN IDs in the private VLAN to the port strip bitmap array/array (block 614). This path of registering the VID then completes (block 640).

Returning to decision block 608, if the VID is not the primary VLAN ID in the PVLAN, then a check is made at block 616 whether the VID is a community VLAN ID in the PVLAN. In response to the VID being a community VLAN ID in the PVLAN, the utility/administrator adds the VID to the port ingress bitmap array as well as to the port egress bitmap array and also adds the primary VID of the private VLAN to the port egress bitmap (block 618). A next check is made at block 620 whether the VID is the PVID of the port, and when the VID is the PVID of the port, the utility/administrator adds the VID and the primary VID of the PVLAN to the port strip bitmap array (block 622). This path of the registering the VID then completes (block 640).

At decision block 616, if the VID is not a community VLAN ID in the PVLAN, a check is made at block 624 whether the VID is an/the isolated VLAN ID in the PVLAN. In response to the determination that the VID is that of the isolated VLAN ID (isolated port) in the PVLAN, the utility/administrator adds the VID to the port ingress bitmap and also adds the primary VID of the PVLAN to the port egress bitmap array (block 626). Then, a next check is performed at block 628 of whether the VID is the PVID of the port. In response to the VID being he PVID of the port (while the VID is also the isolated VLAN ID in the PVLAN), the utility/administrator adds the primary VID of the PVLAN to port strip bitmap (block 630).

Returning back to decision block 604, in response to the VID not being that of a private VLAN, the utility/administrator processes the VID as a regular VID (block 632). The utility/administrator adds the VID to the port ingress bitmap and also adds the VID to the port egress bitmap (block 634). The utility then checks at block 636 whether the VID is the PVID of the port, and in response to the VID being the PVID of the port, the utility adds the VID to the port strip bitmap (block 638). The non private-VLAN portion of the process of registering VLANS and updating the VLAN bitmaps when new VLANs are received for registering within the PVLAN completes at termination block 640.

The above method can also be described from the specific viewpoint of the type of access port for which the bitmap generation is being performed. Thus, for example, when performing generation and/or update of the various ports, the following conditions become applicable.

(1) For an isolated port, where the port is in an isolated sub-domain of a PVLAN, the ingress VLAN Bitmap contains the Isolated VLAN ID, the egress VLAN Bitmap contains the promiscuous (primary) VLAN ID, and the strip VLAN bitmap contains the promiscuous VLAN ID if the PVID of the port is set to the Isolated VID.

(2) For a community port, where the port belongs to a community sub-domain of a PVLAN, the ingress VLAN Bitmap contains the community VLAN ID, the egress VLAN Bitmap contains the community and promiscuous VLAN ID, and the strip VLAN Bitmap contains both the community and promiscuous VLAN ID, if the PVID of the port is set to the community VID.

(3) For the promiscuous port, where the port belongs to the promiscuous sub-domain of a PVLAN, the ingress VLAN Bitmap contains the promiscuous VLAN ID, the egress VLAN Bitmap contains all the VIDs in the PVLAN, i.e. all community, isolated and primary VIDs, and the strip VLAN Bitmap contains all the VIDs in the PVLAN (similar to the Egress), if the PVID of the port is set to the promiscuous VID.

Additionally, if a port belongs to multiple PVLANs, the resulting bitmap of the port is a combined bitmap that is generated by simply merging the bitmaps as generated above. Since the set of VIDs supported by each PVLAN is globally unique, the same combination of ingress, egress and strip bitmaps can support multiple PVLANs on a single port. Also, the non-private VLAN IDs (i.e., regular VLANs) can be supported on the same bitmaps. In this scenario, where the VLAN is not a private VLAN, the ingress and egress VLAN bitmaps will both contain the same bit settings for regular VLANs. The uplink port bitmaps can be automatically generated by performing a merge or a union of the access port bitmaps. In one alternate embodiment, the administrator can explicitly configure the VLANs on the uplink ports.

Within the embodiments presented herein, the methodology for handling the packets correctly requires accuracy with the configuration stages of the bitmaps. In the ingress part, there is a check if the VLAN ID of the frame is supported by the port, and that check is performed against an Ingress bitmap. Within the forwarding part, there is a check whether the destination port supports the VID of the frame. This check is performed against the Egress bitmap. In the Egress part, a check is performed to determine whether or not to strip the frame's tag. This check is performed according to the strip bitmap.

Figure 8A:
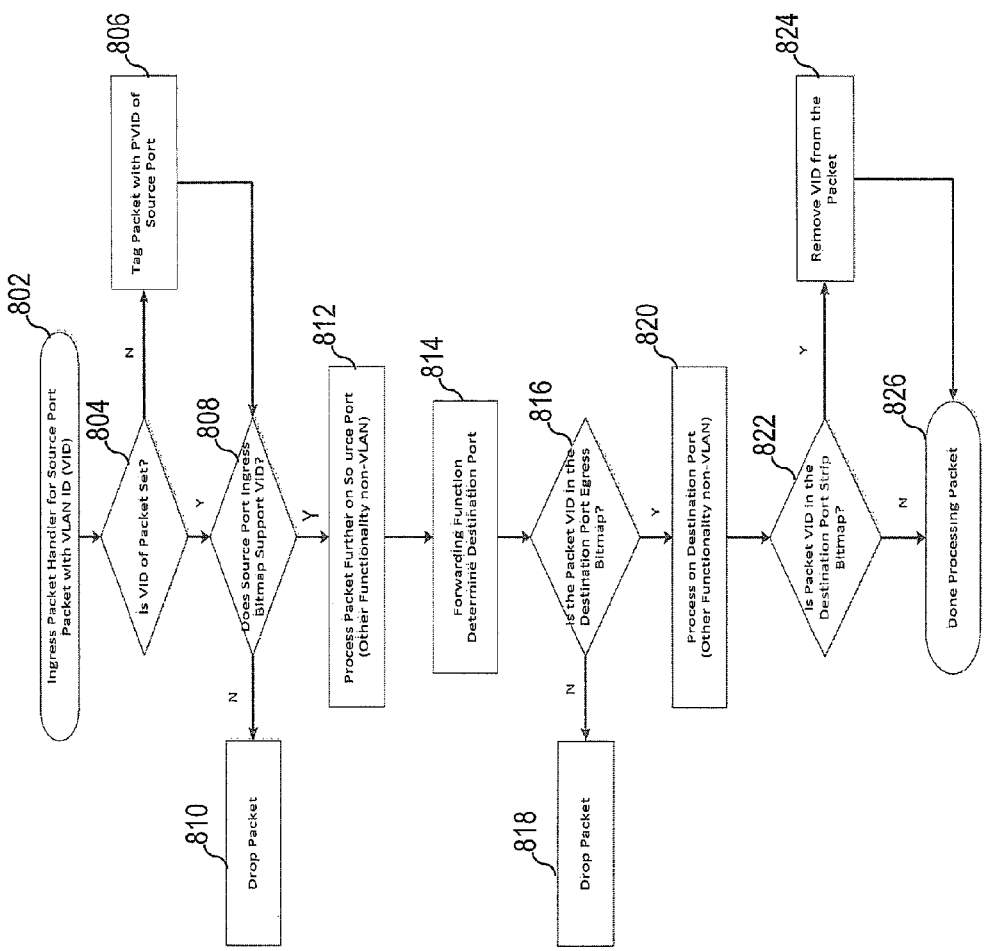
FIGS. 8A and 8B are high-level logical flowcharts respectively illustrating different embodiments of the method of processing a received packet through the DVS utilizing the VLAN ID of the packet and the bitmap arrays, such as the bitmap arrays of FIG. 7, according to one embodiment.
Figure 8B:
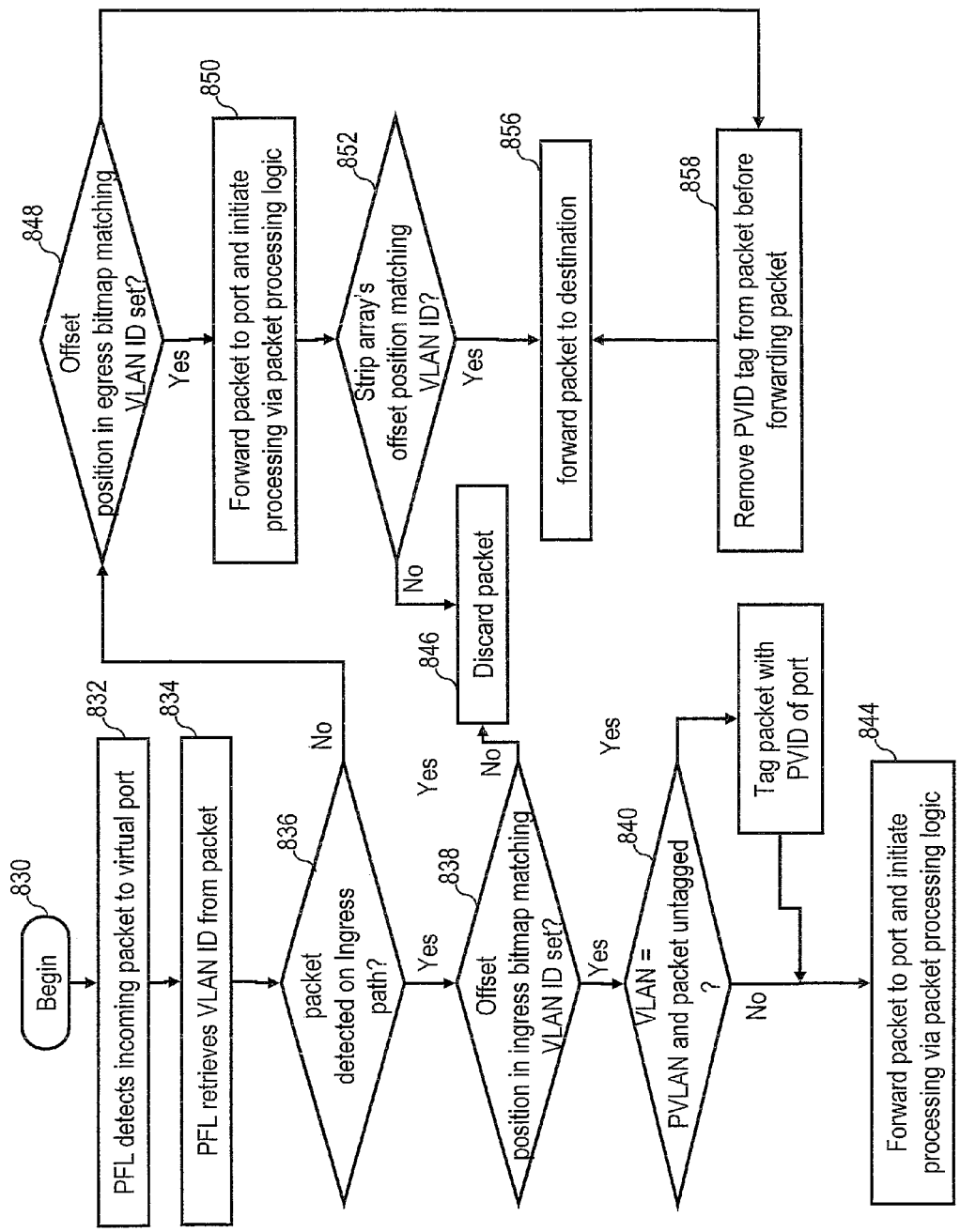

Once the bitmaps and the corresponding PVID value are set correctly, the packet forwarding logic can process/verify the VLANs of a received packet and respond appropriately. The methodology for performing this verification and processing of packets provides an O(1) solution because each packet must be verified via three (3) substantially constant bitmaps and the solution is constant regardless of (i.e., is not depend on) the number of VLANs in the system. Also, the algorithm thus enables one to check whether the packet VLAN ID is set in (belongs to) a particular Bitmap is also a O(1) algorithm. FIGS. 8A and 8B illustrates two embodiments of methods by which certain of the described features of the O(1) algorithm are implemented by the executing firmware or software controlling the relevant port. While the method of FIG. 6 has been described as being implemented via execution of PBRS utility 343 within port controller 340, the present methods are completed via/with one or more of a port forwarding logic, which can be implemented via execution of port packet handling (PPH) utility 344 (FIG. 3). PPH utility 344 executes on one more processors (or virtual processors) of virtualization manager on the host system itself. The various processes can thus be described as being performed by the PPH utility 344 and/or by port forwarding logic, which may in turn be configured and/or instantiated by the network administrator. When initiated by the network administrator, the administrator can interact with the PRBS utility 343 via a command line interface (CLI) on the management console 315, in one embodiment. It is further appreciated that the functionality of the PPH utility 334 can be integrated with that of the PRBS utility 343 to form a single combined utility, which presents itself as an executable code segment and/or logic implemented within the ports of the DVS supporting one or more PVLANs.

Figure 9:
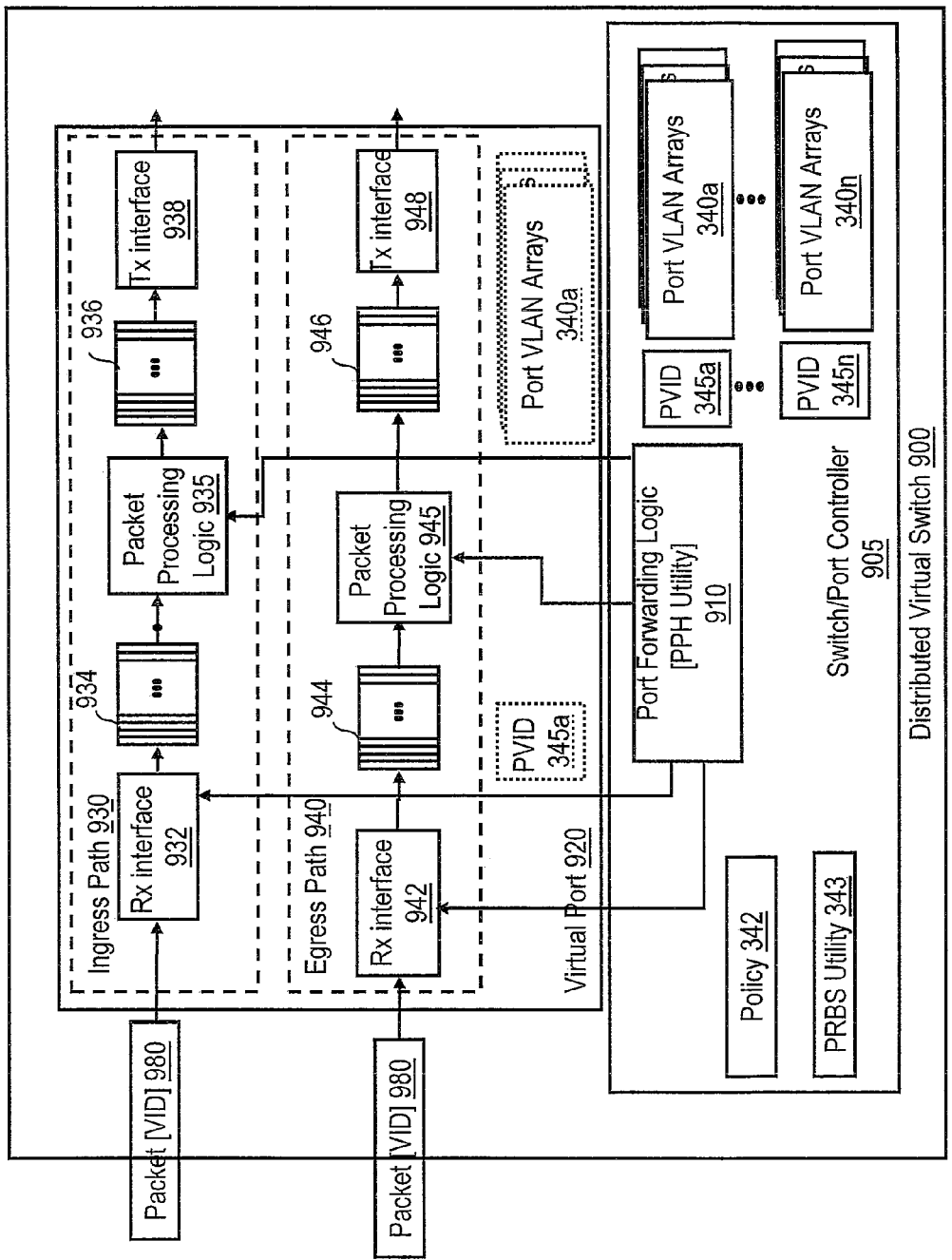
FIG. 9 is a process diagram illustrates processing of packets detected/received on an ingress path and on an egress path of a virtual port utilizing the bitmap arrays, according to one embodiment.

To enable a better understanding of the methods of FIGS. 8A and 8B, reference is made to FIG. 9, which illustrates components of a virtual port and DVS involved in the forwarding and processing of a packet detected on an ingress path and on an egress path of an example virtual port. As provided, DVS 900 comprises one or more port controller logic (port controller) 905, within which is maintained several components and utilities that enable and/or perform the various functions of the embodiments described herein. Port controller 905 comprises policy component 342 and PRBS utility 343. Additionally, port controller 905 comprises a plurality of sets of port VLAN arrays 340a . . . n and associated PVIDs 345a . . . n. As described herein, each set of port VLAN arrays (e.g., arrays 340a) comprises three bitmap arrays, namely ingress bitmap array, egress bitmap array, and strip bitmap array. Port controller 905 also comprises port forwarding logic 910 (which can be generated via execution of the aforementioned PPH utility 344 (FIG. 3). Port forwarding logic connects to and interfaces with receiving interfaces 932 and 942 (or receiving queues 934 and 944, in an alternate embodiment) of ingress path 930 and egress path 940, respectively, of virtual port 920. In the illustrative embodiment, both ingress path 930 and egress path 940 comprise a receiving queue 934, 944 coupled to respective receiving interface 932, 942. Similarly, both paths (930, 940) comprise a transmit queue 936, 946 coupled to a respective transmit interface 938, 948. Packet processing logic 935, 945 are also provided within each path (930, 940). It is appreciated that packet processing logic 935, 945 can simply be an extension of port forwarding logic 910 abstracted to the location within the respective paths (930, 940) at which processing of the received packets occurs. Also, in one embodiment, the virtual port 920 can also maintain a copy of the port's port VLAN arrays 340a and associated PVID 345a.

Referring again to FIG. 8A, the method begins at block 802 at which an ingress packet handler for the source port is instantiated to handle a packet with a VLAN ID (VID). The VLAN ID is retrieved from the packet header when the port detects/receives the packet for processing. The PPH utility determines at block 804 whether the VID of the packet is set. In response to the VID of the packet not being set, the PPH utility tags the packet with the PVID of the source port (block 806). Once the VID of the packet is set or following the PPH utility tagging the packet with the PVID of the source port, the PPH utility determines at block 808 whether the source port's ingress bitmap supports the VID. If the source port ingress bitmap does not support the VID of the packet, the packet is dropped (block 810). However, in response to the source port's ingress bitmap supporting the VID, the PPH utility enables the source port to process the packet (block 812). At block 814, the PPH utility instantiates a forwarding function for the packet and determines the destination port for the packet. With the destination port identified, the PPH utility checks at block 816 whether the packet's VID is in the destination port's egress bitmap. In response to the packet VID not being in the destination port's egress bitmap, the PPH utility drops the packet (block 818). However, in response to the packet VID being in the destination port's egress bitmap, the PPH utility processes the packet on the destination port (block 820). At decision block 822, PPH utility checks whether the packet's VID is in the destination port's strip bitmap. In response to the packet's VID being in the destination port's strip bitmap, the PPH utility removes the VID from the packet (block 824). The PPH utility then completes processing the packet (block 826).

With reference now to FIG. 8B, there is provided a specific implementation of the method defined with reference also to the port forwarding logic of FIG. 9. The method begins at block 830 and proceeds to block 832 which indicate the port forwarding logic 910 detecting an incoming transmission of a packet at a virtual port (e.g., port 920) of the DVS 900. The virtual port is assigned to enable routing of received packets to and from devices within one or more VLANs. Process block 834 then provides the port forwarding logic retrieving a VLAN ID (VID) from the header of the packet. The VLAN ID is a value assigned to uniquely identify the particular VLAN from other VLANs of a plurality of VLANs that can be supported by the first virtual port. Then, a determination is made at block 836 whether the packet is detected on the ingress path (versus the egress path) of the virtual port. Responsive to detecting the packet on an ingress path of the virtual port, the port forwarding logic 910 checks (at block 838) whether an ingress array offset position within an ingress bitmap array of the virtual port is set, which would indicate that the VLAN is supported by the port. The ingress array offset position corresponds to the value of the VID and is set within the ingress bitmap array during configuration of the VLAN on the port. Additionally, each virtual port further comprises a PVID VLAN ID, which indicates a VLAN tag that is added to untagged packets on the ingress path. The method process thus comprises: the port forwarding logic checking at block 840 whether a received packet does not have a PVID. In response to the received packet on the ingress path not having a PVID, the port forwarding logic 910 automatically tags the packet with the PVID of the virtual port (block 842). In response to the ingress array offset position being set and indicating the VLAN is supported by the port, the port forwarding logic 910 receives the packet at the port and initiates processing (via packet processing logic 935) of the received packet by the port (block 844). However, in response to the ingress array offset position not being set, the port forwarding logic 905 discards the packet (846). Thus, the detected packet on the ingress path is only allowed to be processed by the port when the VID identifies a VLAN that has a corresponding offset position in the ingress bitmap array set. Processing of the packet on the ingress path then ends and the next packets received at the port are similarly processed, which processing can be completed concurrently for efficiency.

Returning to decision block 836, responsive to detecting the packet transmission on an egress path 940 of the port (i.e., the packet is not detected on the ingress path 930), the port forwarding logic 910 checks (block 848) whether an egress array offset position within an egress bitmap array of the virtual port is set, which would indicates that the VLAN is supported by the port. The egress array offset position corresponds to the value of the VID and is set within the egress bitmap array during configuration of the VLAN on the port. In response to the egress array offset position being set and indicating the VLAN is supported by the port, the port forwarding logic 910 receives the packet at the port and initiates processing of the received packet by the port (block 850). In response to the egress array offset position not being set, the port forwarding logic 910 discards the packet (block 842). Again, the detected packet on the egress path is only allowed to be processed by the port when the VID identifies a VLAN that has a corresponding offset position in the egress bitmap array set.

For packets detected and/or received on the egress path, the method process further comprises the port forwarding logic 910 checking at block 852 whether a strip array offset position within a strip bitmap array of the virtual port is set, which would indicate that the VLAN is supported by the port and that the VID should be removed before the packet is forwarded. The strip array offset position corresponds to the value of the VID and is set within the strip bitmap array during configuration of the VLAN on the port. In response to the detected packet on the egress path having the PVID tagged thereto, the port forwarding logic automatically removes the PVID from the packet before forwarding the packet (block 858). Responsive to the strip array offset position being set, the port forwarding logic 910 removes the VID from the packet and forwards the packet without the VID to a destination device of the VLAN identified by the packet (block 856). Processing of the packet on the ingress path then ends and the next packets received at the port are similarly processed, which processing can be completed concurrently for efficiency.

The above described illustrative embodiments present a method for efficiently handling packets within virtual ports of a DVS supporting one or more PVLANs configured with community, isolated and promiscuous sub-domains. The method is performed within a host data processing system (host system) having a virtualization manager that configures and enables a virtualized computing environment. The virtualized computing environment includes one or more virtual machines and locally-accessible components of a layer 2 distributed virtual switch (DVS) including a plurality of virtual ports supporting packet transmission within at least one virtual local area network (VLAN). A processing resource of the virtualization manager executes code (e.g., the PPH utility 344) which generates processing logic (e.g., port forwarding logic 910) that performs the method.

In one embodiment of the method: each of the ingress bitmap array, egress bitmap array and strip bitmap array is a single dimension array comprising N bit entries, with each bit corresponding to an offset position from 0 through N−1, where N is an integer number representing a maximum number of individual VLANs that can be supported by the virtual port using globally unique identifiers (ID) ranging in value from 0 through N−1; an offset position in one of the ingress bitmap array, egress bitmap array and strip bitmap array is set when a value of that bit position in the respective bitmap array has a value of one (1); and the process of checking whether the offset position is set comprises comparing the value at that offset position to one (1) and indicating the offset position is set when the value is equal to one (1).

In one implementation, the virtual port can be an access port or an uplink port and each port comprises: an ingress VLAN bitmap containing set offset positions corresponding to VIDs of VLANs that are supported by the port in the ingress path to the port; an egress VLAN bitmap containing set offset positions corresponding to VIDs of VLANs that are supported by the port in the egress path to the port; and a strip VLAN bitmap containing set offset positions corresponding to VIDs identifying VLANS for which the VID is to be removed on the egress path before forwarding the received packet from the port.

In one embodiment, the method comprises: receiving a request (including but not limited to receiving the request via a command line interface (CLI) or a GUI) to add a new VLAN to the virtual port; assigning a globally unique ID to the new VLAN as a new VID; identifying an offset position in each of the bitmap arrays generated for the new VLAN, where the offset positions corresponds to a value of the new VID; updating the respective offset position within each of the bitmap arrays with a value indicating the association of the new VLAN, based on a type characteristic of the virtual port. The method further provides: associating properties to the new VLAN, based on received input from the CLI; and storing the properties of the new VLAN and instantiating the port to process packets to and from devices of the new VLAN, whose packet communication is supported by the port.

In one embodiment, the method further comprises: in response to receiving a request to add a new port to a PVLAN: assigning a unique Port VLAN ID (PVID) to the new port; autonomously generating an ingress bitmap array, an egress bitmap array, and a strip bitmap array for the new port; setting appropriate offset positions of each of the ingress bitmap array, the egress bitmap array, and the strip bitmap array corresponding to each VLAN and each PVLAN that are supported by the port; storing the ingress bitmap array, the egress bitmap array, and the strip bitmap array for use when processing packets received on the ingress path and the egress path of the new port; and storing the assigned PVID VLAN ID along with the bitmap arrays. Further, in one implementation, the autonomously generating and the setting of appropriate offset positions of each of the ingress bitmap array, the egress bitmap array, and the strip bitmap array comprises: identifying which one of an isolated sub-domain, a community sub-domain and a promiscuous sub-domain of a PVLAN the new port is associated with, where the isolated sub-domain has an isolated VLAN ID (VID), the community sub-domain has a community VID that is unique for that community sub-domain among multiple community sub-domains, and the promiscuous sub-domain shares the primary VLAN ID as the promiscuous VID. The method further provides: in response to the new port being associated with an isolated sub-domain, setting a bit value at an ingress offset position within the ingress bitmap array corresponding to the isolated VID, setting a bit value at an egress offset position within the egress bitmap array corresponding to the promiscuous VID, wherein the promiscuous VID is the same as the primary VLAN ID, and setting a bit value at a strip offset position within the strip bitmap corresponding to the promiscuous VID if the PVID of the new port is set to the isolated VID; in response to the new port being associated with a community sub-domain, setting an ingress offset position within the ingress bitmap array corresponding to the community VID, setting a first bit value at a first egress offset position within the egress bitmap array corresponding to the promiscuous VID and setting a second bit value at a second egress offset position within the egress bitmap array corresponding to the community VID, and setting both a first bit value at a first strip offset position and a second bit value at a second strip offset position within the strip bitmap corresponding respectively to the community VID and the promiscuous VID, if the PVID of the new port is set to the community VID; and in response to the new port being associated with a promiscuous sub-domain, setting an ingress offset position within the ingress bitmap array corresponding to the promiscuous VID, setting bit values at one or more egress offset positions within the egress bitmap array corresponding to VIDs of each community sub-domain, the isolated sub-domain and the primary domain in the PVLAN, and setting bit values at one or more egress offset positions within the egress bitmap array corresponding to VIDs of each community sub-domain, the isolated sub-domain and the primary domain in the PVLAN.

Additionally, the above embodiment provides: in response to the new port being associated with multiple PVLANs with each having a set of globally unique VIDs, the autonomously generating and the setting of appropriate offset positions of each of the ingress bitmap array, the egress bitmap array, and the strip bitmap array comprises: merging respective ones of each set of three bitmaps generated for each PVLAN into a single set of three combined bitmaps, wherein multiple ingress bitmap arrays are merged into a single combined ingress bitmap array, multiple egress bitmap arrays are merged into a single combined egress bitmap array, and multiple strip bitmap arrays are merged into a single combined strip bitmap array.

According to one implementation, in response to receipt of a request to add a VLAN to the DVS, the method comprises: generating the ingress bitmap array and the egress bitmap array with a same bit setting for access port bitmaps of non-private VLANs; and automatically generating an ingress bitmap and an egress bitmap for an uplink port by merging all of the egress bitmaps and ingress bitmaps that belong to the VLAN. In one embodiment, the VLAN bitmap of an uplink port can be generated by an alternate method that involves the following processes: (a) for the ingress bitmap, merge VLAN bitmaps of all access ports (ingress and egress) that are supported by the uplink port; for the egress bitmap, merge VLAN bitmaps of all access ports (ingress and egress) that are supported by the uplink port. Finally, the strip bitmap depends on the PVID assigned to the uplink port.

One embodiment of the invention provides a computer program product comprising: a computer readable storage medium; and program code on the computer readable medium that when executed by a processor associated with a virtualization manager executing on a data processing system to generate a virtualized computing environment having one or more distributed virtual switches (DVS), causes the virtualization manager to perform each of the above recited method functions.

Also, another embodiment of the invention provides a data processing system comprising: one or more processors providing processing resources; one or more memories coupled to the one or more processors; one or more network interfaces that enables communication with other devices via a physical network; and a virtualization manager that configures the data processing system as a virtualized machine having a distributed virtual switch (DVS) and one or more virtual machines that communicate within a virtual local area network (VLAN) via ports associated with the DVS within a virtualized environment, and wherein the virtualization manager comprises one or more executable utilities, including packet processing logic, that execute on a processing resource and causes the virtualization manager to: assign a globally unique VLAN identifier (ID) to each sub-domain of a PVLAN established within the virtualized environment on the host system; tag packets in the outbound path from and the inbound path to a virtual port of the DVS within the PVLAN with a correct VID; and dynamically validate a VID of a received packet on the inbound and the egress path to the virtual port by performing the various functions of the above described embodiments of the method.

Additionally, in one embodiment of the data processing system: the virtual port is one or more of an access port and an uplink port and each port comprises: an ingress VLAN bitmap containing set offset positions corresponding to VIDs of VLANs that are supported by the port in the ingress path to the port; an egress VLAN bitmap containing set offset positions corresponding to VIDs of VLANs that are supported by the port in the egress path to the port; and a strip VLAN bitmap containing set offset positions corresponding to VIDs identifying VLANS for which the VID is to be removed on the egress path before forwarding the received packet from the port; the VLAN is a private VLAN (PVLAN) and each virtual port further comprises a PVID VLAN ID, which indicates a VLAN tag that is added to untagged packets on the ingress path; multiple distributed virtual switches are supported by a same set of PVLANs, multiple PVLAN domains are provided within a single DVS, and PVLAN policies are uniformly enforced by packet handling logic of the virtualization manager; and the one or more executable utilities further causes the virtualization manager to: automatically tag the packet with the PVID of the virtual port, in response to the received packet on the ingress path not having a VID; and automatically remove the VID from the packet before forwarding the packet, in response to the detected packet on the egress path having the PVID tagged thereto.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer program product having a computer readable medium containing computer readable/program code/instructions such that a series of steps are performed when the computer readable/program code/instructions are executed (by a processing unit/processor) on a computing device/machine. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product, comprising a computer readable storage device and program code on the computer readable storage device that when executed by a processor associated with a virtualization manager executing on a data processing system generates a virtualized computing environment having one or more distributed virtual switches (DVS) and causes the virtualization manager to perform functions of:

detecting an incoming transmission of a packet at a first virtual port of the DVS, wherein the first virtual port is assigned to enable routing of received packets to and from devices within one or more Virtual Local Access Networks (VLANs);

retrieving a VLAN ID (VID) from header of the packet, wherein the VLAN ID is a value assigned to uniquely identify a particular VLAN from other VLANs of a plurality of VLANs that can be supported by the first virtual port;

in response to detecting the packet on an ingress path of the first virtual port:

checking whether an ingress array offset position within an ingress bitmap array of the first virtual port is set, indicating that the VLAN is supported by the first virtual port, wherein the ingress array offset position corresponds to the value of the VID and is set within the ingress bitmap array during configuration of the VLAN on the first virtual port;

in response to the ingress array offset position being set and indicating the VLAN is supported by the first virtual port, receiving the packet at the first virtual port and initiating processing of the received packet by the first virtual port; and in response to the ingress array offset position not being set, discarding the packet;
wherein a detected packet on the ingress path is only allowed to be processed by the first virtual port when the VID identifies a VLAN that has a corresponding offset position in the ingress bitmap array set; and in response to detecting transmission of a packet on an egress path of the first virtual port:
checking whether an egress array offset position within an egress bitmap array of the first virtual port is set, indicating that the VLAN is supported by the first virtual port, wherein the egress array offset position corresponds to the value of the VID and is set within the egress bitmap array during configuration of the VLAN on the first virtual port;
in response to the egress array offset position being set and indicating the VLAN is supported by the first virtual port, receiving the packet at the first virtual port and initiating processing of the received packet by the first virtual port;
in response to the egress array offset position not being set, discarding the packet;
checking whether a strip array offset position within a strip bitmap array of the first virtual port is set, indicating that the VLAN is supported by the first virtual port and that the VID should be removed before the packet is forwarded, wherein the strip array offset position corresponds to the value of the VID and is set within the strip bitmap array during configuration of the VLAN on the first virtual port; and
in response to the strip array offset position being set, removing the VID from the packet and forwarding the packet without the VID to a destination device of the VLAN identified by the packet;
wherein a detected packet on the egress path is only allowed to be processed by the first virtual port when the VID identifies a VLAN that has a corresponding offset position in the egress bitmap array set.

2. The computer program product of claim 1, wherein:
each of the ingress bitmap array, egress bitmap array and strip bitmap array is a single dimension array comprising N bit entries, with each bit corresponding to an offset position from 0 through N−1, where N is an integer number representing a maximum number of individual VLANs that can be supported by the virtual port using globally unique identifiers (ID) ranging in value from 0 through N−1; and
the program code further comprises code that executes and causes the virtualization manager to perform functions of:
setting an offset position in one of the ingress bitmap array, egress bitmap array and strip bitmap array when a value of that bit position in the respective bitmap array has a value of one (1); and
checking whether the offset position is set by comparing the value at that offset position to one (1) and indicating the offset position is set when the value is equal to one (1).

3. The computer program product of claim 1, wherein:
the first virtual port is one or more of an access port and an uplink port and each port comprises: an ingress VLAN bitmap containing set offset positions corresponding to VIDs of VLANs that are supported by the port in the ingress path to the port; an egress VLAN bitmap containing set offset positions corresponding to VIDs of VLANs that are supported by the port in the egress path to the port; and a strip VLAN bitmap containing set offset positions corresponding to VIDs identifying VLANs for which the VID is to be removed on the egress path before forwarding the received packet from the port;
the VLAN is a private VLAN (PVLAN) and each virtual port further comprises a Private VLAN ID (PVID), which indicates a VLAN tag that is added to untagged packets on the ingress path; and
the program code comprises code for:
in response to the received packet on the ingress path not having a VID, automatically tagging the packet with the PVID of the virtual port; and
in response to the detected packet on the egress path having the PVID tagged thereto, automatically removing the VID from the packet before forwarding the packet.

4. A data processing system comprising:
one or more processors providing processing resources;
one or more memories coupled to the one or more processors;
one or more network interfaces that enables communication with other devices via a physical network;
a virtualization manager that configures the data processing system as a virtualized machine having a distributed virtual switch (DVS) and one or more virtual machines that communicate within a virtual local area network (VLAN) via ports associated with the DVS within a virtualized environment, and wherein the virtualization manager comprises one or more executable utilities that execute on a processing resource and causes the virtualization manager to:
assign a globally unique VLAN identifier (ID) to each sub-domain of a PVLAN established within the virtualized environment on a host system;
tag packets in an egress path from and an ingress path to a virtual port of the DVS within the PVLAN with a correct VID;
dynamically validate a VID of a received packet on the ingress and the egress path to the virtual port, where the virtualization manager:
detects an incoming transmission of a packet at a first virtual port of the DVS, wherein the first virtual port is assigned to enable routing of received packets to and from devices within one or more VLANs;
retrieves a VLAN ID (VID) from header of the packet, wherein the VLAN ID is a value assigned to uniquely identify a particular VLAN from other VLANs of a plurality of VLANs that can be supported by the first virtual port;
in response to detecting the packet on an ingress path of the first virtual port:
checks whether an ingress array offset position within an ingress bitmap array of the first virtual port is set, indicating that the VLAN is supported by the first virtual port, wherein the ingress array offset position corresponds to the value of the VID and is set within the ingress bitmap array during configuration of the VLAN on the first virtual port;
in response to the ingress array offset position being set and indicating the VLAN is supported by the port, receives the packet at the port and initiating processing of the received packet by the port; and
in response to the ingress array offset position not being set, discards the packet;
wherein a detected packet on the ingress path is only allowed to be processed by the port when the VID identifies a VLAN that has a corresponding offset position in the ingress bitmap array set; and in response to detecting transmission of a packet on an egress path of the port:

checks whether an egress array offset position within an egress bitmap array of the virtual port is set, indicating that the VLAN is supported by the port, wherein the egress array offset position corresponds to the value of the VID and is set within the egress bitmap array during configuration of the VLAN on the port;

in response to the egress array offset position being set and indicating the VLAN is supported by the port, receives the packet at the port and initiating processing of the received packet by the port; and in response to the egress array offset position not being set, discards the packet;

wherein a detected packet on the egress path is only allowed to be processed by the port when the VID identifies a VLAN that has a corresponding offset position in the egress bitmap array set.

5. The data processing system of claim 4, wherein the one or more executable utilities that execute on the processing resource further causes the virtualization manager to:

check whether a strip array offset position within a strip bitmap array of the virtual port is set, indicating that the VLAN is supported by the port and that the VID should be removed before the packet is forwarded, wherein the strip array offset position corresponds to the value of the VID and is set within the strip bitmap array during configuration of the VLAN on the port; and in response to the strip array offset position being set, remove the VID from the packet and forwarding the packet without the VID to a destination device of the VLAN identified by the packet.

6. The data processing system of claim 5, wherein:

each of the ingress bitmap array, egress bitmap array and strip bitmap array is a single dimension array comprising N bit entries, with each bit corresponding to an offset position from 0 through N−1, where N is an integer number representing a maximum number of individual VLANs that can be supported by the virtual port using globally unique identifiers (ID) ranging in value from 0 through N−1;

an offset position in one of the ingress bitmap array, egress bitmap array and strip bitmap array is set when a value of that bit position in the respective bitmap array has a value of one (1); and the executable utilities causing the virtualization manager to check whether the offset position is set comprises the utilities causing the virtualization manager to compare the value at that offset position to one (1) and indicating the offset position is set when the value is equal to one (1).

7. The data processing system of claim 5, wherein:

the virtual port is one or more of an access port and an uplink port and each port comprises: an ingress VLAN bitmap containing set offset positions corresponding to VIDs of VLANs that are supported by the port in the ingress path to the port; an egress VLAN bitmap containing set offset positions corresponding to VIDs of VLANs that are supported by the port in the egress path to the port; and a strip VLAN bitmap containing set offset positions corresponding to VIDs identifying VLANS for which the VID is to be removed on the egress path before forwarding the received packet from the port;

the VLAN is a private VLAN (PVLAN) and each virtual port further comprises a Private VLAN ID (PVID), which indicates a VLAN tag that is added to untagged packets on the ingress path;

multiple distributed virtual switches are supported by a same set of PVLANs, multiple PNLAN domains are provided within a single DVS, and PVLAN policies are uniformly enforced by packet handling logic of the virtualization manager; and the one or more executable utilities further causes the virtualization manager to:

in response to the received packet on the ingress path not having a PVID, automatically tag the packet with the PVID of the virtual port; and in response to the detected packet on the egress path having the VID tagged thereto, automatically remove the VID from the packet before forwarding the packet.

\* \* \* \* \*